United States Patent
Rao et al.

(10) Patent No.: US 12,197,574 B2
(45) Date of Patent: Jan. 14, 2025

(54) DETECTING MICROSOFT WINDOWS INSTALLER MALWARE USING TEXT CLASSIFICATION MODELS

(71) Applicant: Palo Alto Networks, Inc., Santa Clara, CA (US)

(72) Inventors: Akshata Krishnamoorthy Rao, Mountain View, CA (US); Yaron Samuel, Tel Aviv (IL); Lauren Che, Dublin, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 36 days.

(21) Appl. No.: 17/550,420

(22) Filed: Dec. 14, 2021

(65) Prior Publication Data
US 2023/0185915 A1    Jun. 15, 2023

(51) Int. Cl.
| G06F 21/00 | (2013.01) |
| G06F 21/54 | (2013.01) |
| G06F 21/55 | (2013.01) |
| G06F 21/56 | (2013.01) |

(52) U.S. Cl.
CPC ............ G06F 21/566 (2013.01); G06F 21/54 (2013.01); G06F 21/554 (2013.01); G06F 21/564 (2013.01)

(58) Field of Classification Search
CPC ...... G06F 21/564; G06F 21/554; G06F 21/54; G06F 21/566
USPC .......................................................... 726/22
See application file for complete search history.

(56) References Cited

U.S. PATENT DOCUMENTS

| 8,838,992 | B1 * | 9/2014 | Zhu ....................... G06F 21/563 713/186 |
| 9,444,831 | B1 * | 9/2016 | Lee ....................... H04L 63/1416 |
| 10,956,477 | B1 * | 3/2021 | Fang ....................... G06F 40/30 |
| 11,425,151 | B2 * | 8/2022 | Kaidi ..................... G06F 21/554 |
| 11,574,053 | B1 * | 2/2023 | Chen ....................... G06N 20/00 |
| 11,822,657 | B2 * | 11/2023 | Tseng ..................... G06N 20/00 |
| 2007/0067843 | A1 * | 3/2007 | Williamson ........... G06F 21/568 726/24 |
| 2009/0133125 | A1 * | 5/2009 | Choi ....................... G06F 21/562 726/24 |
| 2013/0185623 | A1 * | 7/2013 | Wicker ................ H04L 63/1466 715/234 |
| 2017/0093893 | A1 * | 3/2017 | Davydov ................. G06F 21/51 |

(Continued)

FOREIGN PATENT DOCUMENTS

KR    20080110894    * 12/2008    ........... H04L 63/166

OTHER PUBLICATIONS

Ajay. Applying Deep Learning for Pe-Malware Classification. Quick Heal Blog. Jan. 10, 2019: https://blogs.quickheal.com/applying-dl-pe-malware-classification/.

(Continued)

*Primary Examiner* — Josnel Jeudy
(74) *Attorney, Agent, or Firm* — Van Pelt, Yi & James LLP

(57) ABSTRACT

The present application discloses a method, system, and computer system for detecting malicious files. The method includes receiving a sample, extracting an embedded script from the sample, applying a malicious script detector in connection with determining whether the sample is malicious, and in response to determining that the sample is malicious sending, to a security entity, an indication that the sample is malicious.

22 Claims, 8 Drawing Sheets

(56) References Cited

U.S. PATENT DOCUMENTS

| | | | | |
|---|---|---|---|---|
| 2019/0034823 | A1* | 1/2019 | Thapliyal | G06F 16/35 |
| 2019/0102552 | A1* | 4/2019 | Pavlyushchik | G06F 21/566 |
| 2019/0251251 | A1* | 8/2019 | Carson | G06F 21/561 |
| 2020/0311259 | A1* | 10/2020 | Schmugar | G06F 21/554 |
| 2021/0117544 | A1* | 4/2021 | Kurtz | G06F 21/567 |
| 2021/0326035 | A1* | 10/2021 | Jia | G06N 20/00 |
| 2023/0342462 | A1* | 10/2023 | Ducau | G06N 3/08 |

OTHER PUBLICATIONS

Bokobza et al. Machine Learning for Cyber Security—Static Detection of Malicious PE Files. Jan. 22, 2019: https://www.cyberbit.com/blog/endpoint-security/machine-learning-for-cyber-security-static-detection/.

Gilbert et al. The rise of machine learning for detection and classification of malware: Research developments, trends and challenges. Journal of Network and Computer Applications. vol. 153, Mar. 1, 2020, 102526: https://www.sciencedirect.com/science/article/pii/S1084804519303868.

Karl Ackerman. Performing Suspect Power Shell Detection with a Yara Rule. Sophos. Aug. 22, 2021: https://community.sophos.com/intercept-x-endpoint/f/recommended-reads/129682/performing-suspect-power-shell-detection-with-a-yara-rule.

Maglaque et al. Fake Installers Drop Malware and Open Doors for Opportunistic Attackers. Sep. 27, 2021: https://www.trendmicro.com/en_us/research/21/i/fake-installers-drop-malware-and-open-doors-for-opportunistic-attackers.html.

Microsoft Defender ATP Team. Deep learning rises: New methods for detecting malicious PowerShell. Sep. 3, 2019: https://www.microsoft.com/security/blog/2019/09/03/deep-learning-rises-new-methods-for-detecting-malicious-powershell/.

Wang et al. A deep learning approach for detecting malicious JavaScript code. Security and Communication Networks Security Comm. Networks 2016; 9:1520-1534. Published online Feb. 11, 2016 in Wiley Online Library (wileyonlinelibrary.com). DOI: 10.1002/sec. 1441.

* cited by examiner

DETECTING MICROSOFT WINDOWS INSTALLER MALWARE USING TEXT CLASSIFICATION MODELS

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

Figure 1:
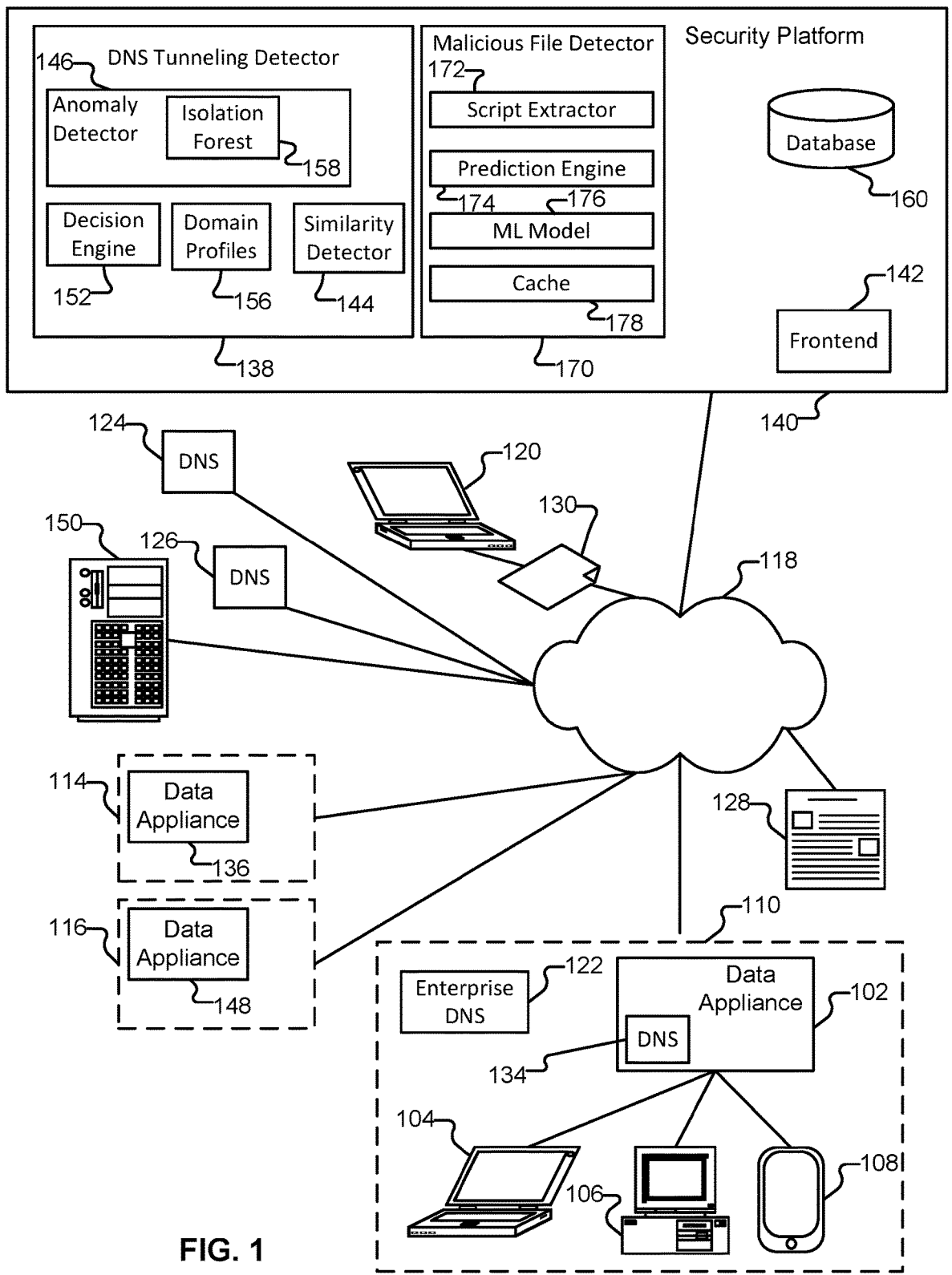
FIG. 1 is a block diagram of an environment in which a malicious file is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a feature is a measurable property or characteristic manifested in input data, which may be raw data. As an example, a feature may be as set of one or more relationships manifested in the input data. As another example, a feature may be a set of one or more relationships between maliciousness of a file (e.g., an indication of whether the file is malicious) and an attribute or information pertaining to the file, such as an attribute or information obtained from a script corresponding to the file.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity.

As used herein, malware refers to an application that engages in behaviors, whether clandestinely or not (and whether illegal or not), of which a user does not approve/ would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

According to related art, malware is identified using machine learning models. Machine learning models according to related art are trained/developed using portable executable (PE) structures based on features such as imports, headers and sections. The machine learning models use such imports, headers and sections to distinguish between malware and benign files. However, the PE file structure for Microsoft Windows PE installer based files look extremely similar between malicious and benign files. Accordingly, using the PE file structure for Microsoft Windows PE installer to detect malware is not very reliable because of the extreme difficulty in distinguishing between malicious and benign files based on such PE file structure. For example, use of the PE file structure to detect malicious files for Microsoft Windows PE installer files leads to higher false positives and poor detection rate. An example of Microsoft Windows PE installer files used for benign purposes is Microsoft Windows Nullsoft Scriptable Install System (NSIS) installers, which are popularly used by legitimate products and in corporate environments. Each machine learning model trained to analyze PE structures to distinguish between malicious Microsoft Windows PE installer files and benign Microsoft Windows PE installer files will be unable to accurately detect malicious files.

A system, method, and/or device for predicting or detecting a malicious file is disclosed. The system includes one or more processors and a memory coupled to the one or more processors and configured to provide the one or more processors with instructions. The one or more processors are configured to receive a sample, extract an embedded script from the sample, apply a malicious script detector in connection with determining whether the sample is malicious, and in response to determining that the sample is malicious, send, to a security entity, an indication that the sample is malicious.

An installer file generally includes a script that describes the core logic for performing the installation tasks. Installer-based malware uses the script to execute its corresponding malicious code. According to various embodiments, the use of the script to execute malicious code thus embeds clues in the script itself for identifying the nature of the installer. Various embodiments use a machine learning model to detect malicious files based at least in part on the script corresponding to a file such as an installer file. In some embodiments, a text classification model (e.g., a text classification model machine learning model) used in connection with determining whether a file is malicious. The text classification machine learning model is trained/developed using content of installer scripts (e.g., text or other information comprised in the scripts) used in benign and malicious installer files. As an example, the text classification model can be a machine learning or deep learning model that learns from the characters, tokens or terms in the scripts of malicious and/or benign files. According to various embodiments, information is extracted from the installer file in a sandboxed environment. The information may comprise content of the installer file such as a script corresponding to the installer file. In some embodiments, in response to extracting the information from the installer file, the system uses the machine learning model (e.g., the text classification model for analyzing and/or classifying scripts) in connection with determining whether the file (e.g., the installer file) is malicious and/or determining a likelihood that the file is malicious.

In some embodiments, analyzing and/or using the script corresponding to a file in connection with determining whether a file is malicious is one element of a set of elements used to determine whether a file is malicious. For example, the system may use a plurality of factors (e.g., elements) in connection with determining whether a file is malicious. In some embodiments, the system determines (e.g., generates) an aggregate profile corresponding to a file, and uses the aggregate profile to determine whether the file is malicious.

As an example, the aggregate profile comprises a plurality of likelihoods that the file is malicious, and the various likelihoods that the file is malicious may be determined using different methods, or various information or attributes pertaining to the file. In some embodiments, the system predicts whether the file is malicious based at least in part on an aggregate likelihood that the file is malicious. The aggregate likelihood may be a weighted likelihood that is determined by associating weights to each of the plurality of likelihoods that the file is malicious which are determined using different methods, or various information or attributes pertaining to the file. The various weights for each of (or at least a subset of) the plurality of likelihoods that a file is malicious may be predefined. For example, the various weights may be defined by a developer or administrator, such as an administrator of a security detection service, a network administrator, an organization administrator, etc. In some embodiments, the various weights are determined based on a machine learning model and/or a predefined or selected sensitivity of the system, method, or device for detecting whether a file is malicious. According to various embodiments, the system determines that a file is malicious in response to a determination that the aggregate likelihood that the file is malicious exceeds a predefined threshold value (e.g., a malicious likelihood threshold). The predefined threshold value may be predefined by a user. For example, an administrator may set the predefined threshold value. As an example, the predefined threshold value may be set based at least in part on a desired sensitivity for detecting a malicious files (e.g., a predefined acceptable false positive rate and/or predefined acceptable false negative rate, etc.).

According to various embodiments, using a model (e.g., a machine learning model) to analyze a script of a file (e.g., an installer script) is one of a plurality of detection techniques to predict the maliciousness of the script (e.g., and thus the maliciousness of the file). For example, a prediction technique of analyzing the script to determine whether the script/file is malicious is used as an input to a detection system that uses a plurality of inputs corresponding to different detection techniques. The detection system provides the final verdict of maliciousness with respect to the sample and/or file.

According to various embodiments, the model (e.g., the machine learning model to detect malicious files based at least in part on the script corresponding to a file such as an installer file) is trained incrementally. For example, the model is re-trained to retain the knowledge learned on datasets of older malicious files/scripts and datasets of older benign files/scripts. For example, the model may be trained based on false positives such as by incorporating false positives into the training set, and/or adding identifiers for the known false positives to the detection system to filter verdicts from the installer script model.

According to various embodiments, the model to detect malicious files based at least in part on the script corresponding to a file (e.g., the machine learning model to detect malicious files based at least in part on the script corresponding to a file such as an installer file) is used in conjunction with one or more other techniques or classification models to determine whether a file is malicious (e.g. to generate an aggregated likelihood that the file is malicious or to generate an aggregated determination of whether the file is malicious). Examples of the one or more other techniques or classifications include (i) a detection based on a byte pattern matching, (ii) a detection based on a PE file structure, (iii) a detection based on a dynamic analysis of malware inside a sandbox, (iv) a detection of child PE files embedded in or downloaded by the installer, (v) a detection based on text-based learning on Powershell and Javascript, and/or (v) a third party service or community-based scoring/assessment such as a ground truth or VirusTotal® score. Various other techniques or classifications may be implemented in connection (e.g., conjunction) with the model to detect malicious files based at least in part on the file or the script corresponding to a file.

According to various embodiments, a detection based on a byte pattern matching uses rules associated with matching keywords in scripts and/or files. The byte pattern detection rules are typically manually generated rules, and require domain knowledge expertise. An example is using the YARA engine (e.g., YARA is a tool aimed at (but not limited to) helping malware researchers to identify and classify malware samples). YARA rules are used to classify and identify malware samples by creating descriptions of malware families based on textual or binary patterns. In contrast to detection based on a byte pattern matching, the model to detect malicious files based at least in part on the script corresponding to a file is auto learned on malicious and benign scripts (e.g., the model is trained/developed using historical datasets of malicious files and historical datasets of benign files).

According to various embodiments, a detection based on a PE file structure uses machine learning models that are trained/developed based using portable executable (PE) structures based on features such as imports, headers and sections. The machine learning models use such imports, headers and sections to distinguish between malware and benign files. However, as described above, the PE file structure for Microsoft Windows PE installer based files look extremely similar between malicious and benign files.

According to various embodiments, a detection based on a dynamic analysis of malware inside a sandbox monitors a behavior (e.g., execution behavior) of a file. However, such a detection method or technique may not succeed if the file (e.g., the sample) crashes or tries to evade detection in the sandbox environment. In contrast to a detection using a dynamic analysis of the file inside a sandbox, the model to detect malicious files based at least in part on the script corresponding to a file is auto learned on malicious and benign scripts (e.g., the model is trained/developed using historical datasets of malicious files and historical datasets of benign files), and the model according to various embodiments detects or predicts whether a sample is malicious by analyzing a corresponding installer script (e.g., the sample does not need to be executed within a sandbox for the model according to various embodiments to accurately predict whether a script is malicious).

According to various embodiments, a detection of child PE files embedded in or downloaded by the installer analyzes individual child files of a PE file. However, in cases where the child PE files are themselves not malicious, but are invoked maliciously or if the malicious installer uses Microsoft Windows shell commands to perform its activities, the model according to various embodiments analyzes a script of an installer file rather than the child files themselves.

According to various embodiments, a detection based on text-based learning on Powershell and Javascript analyzes individual files and does not analyze script embedded within an installer. In contrast, according to various embodiments, content (e.g., information, scripts, etc.) are extracted from a file, and the script is analyzed using a model such as a machine learning model to determine (e.g., predict) whether a sample is malicious.

In some embodiments, the model to detect malicious files based at least in part on the script corresponding to a file uses characters, n-grams, or words comprised in the script. Various embodiments detect patterns in the script and determine, based at least in part on the patterns in the script, whether the file is malicious. For example, the system compares the patterns to one or more patterns associated with scripts in a training set. As another example, the system determines properties associated with the patterns and uses the properties to determine whether the file is malicious, such as by comparing the properties of the pattern to features trained using training sets of malicious files and training sets of benign files.

Various other machine learning processes may be implemented in connection with determining whether a file is malicious. For example, text classification models such as Recurrent Neural Networks (RNNs), Convolutional Neural Networks (CNNs), Long Short Term Memory (LSTM) models may be implemented.

In some embodiments, the system obtains training sets for scripts corresponding to malicious files and scripts corresponding to benign files. The system may obtain the training sets (e.g., historical datasets of malicious files and historical datasets of benign files) from a third party service such as VirusTotal®. The third party service may provide a set of files deemed to be malicious and a set of files deemed to be benign. As an example, the third party service may analyze the file and provide an indication whether a file is malicious or benign, and/or a score indicating the likelihood that the file is malicious. The system may receive (e.g., at predefined intervals, as updates are available, etc.) updates from the third party service such as with newly identified benign or malicious files, corrections to previous mis-classifications, etc. In some embodiments, an indication of whether a file in the training set (e.g., the historical datasets) corresponds to a social score such as a community-based score or rating (e.g., a reputation score) indicating that a file is malicious or likely to be malicious.

Various embodiments detect whether a file is malicious based at least in part on a corresponding installer script. In some embodiments, the installer script is analyzed to determine one or more attributes associated with the installer script, and the system determines whether the file is malicious based at least in part on the one or more attributes associated with the installer script. Examples of the one or more attributes of the installer script include: executable file(s) referenced or called in the script, reference to a bitcoin wallet in the script, etc. A machine learning model is trained to determine whether a file is malicious (or to determine a likelihood that the file is malicious) based at least in part on the one or more attributes. For example, the system may identify an executable called by the execution logic of the script, and based on the attribute(s) or properties of the executable, the system may determine that the file is malicious or likely to be malicious. An example of attribute(s) or properties associated with executable called by the execution logic of the script that may be indicative of the file being malicious is that the executable has a random or garbled alphanumeric name (e.g., o07xvqfw8.exe, etc.).

According to various embodiments, a security entity and/or network node (e.g., a client, device, etc.) handles a file based at least in part on an indication that the sample is malicious and/or that the file matches the sample indicated to be malicious. In response to receiving indication that the sample is malicious, the security network and/or network node may update a mapping of samples to an indication of whether the corresponding sample is malicious, and/or a blacklist of files. In some embodiments, the security entity and/or the network node receives a signature pertaining to a file (e.g., a sample deemed to be malicious), and the security entity and/or the network node stores the signature of the file for use in connection with detecting whether files obtained, such as via network traffic, are malicious (e.g., based at least in part on comparing a signature generated for the file with a signature for a file comprised in a blacklist of files). As an example, the signature may be a hash.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

The system improves detection of malicious files. Further, the system further improves the handling of network traffic by preventing (or improving prevention of) malicious files being across a network such as among nodes within a network, or preventing malicious files from entering a network. The system determines files that are deemed to be malicious or likely to be malicious such as based on a script corresponding to the file (e.g., an installer script). Related art detection techniques that use a structure of a file may be insufficient/inaccurate with respect to files having similar structures/profiles among malicious or benign files, such as Windows Portable PE installer files. Further, the system can provide accurate and low latency updates to security entities (e.g., endpoints, firewalls, etc.) to enforce one or more security policies (e.g., predetermined and/or customer-specific security policies) with respect to traffic comprising malicious files. Accordingly, the system prevents proliferation of malicious traffic (e.g., files) to nodes within a network.

FIG. 1 is a block diagram of an environment in which a malicious file is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 140. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, providing a list of signatures of known-malicious files to data appliances, such as data appliance 102 as part of a subscription, detecting malicious files (e.g., an on-demand detection, or a periodical based updates to a mapping of files to indications of whether the file is malicious or benign), providing a likelihood that a file is malicious or benign, provide/update a whitelist of files deemed to be benign, provide/update files deemed to be malicious, identifying malicious domains, detecting malicious files, predicting whether a file is malicious, and providing an indication of that a file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises DNS tunneling detector 138 and/or malicious file detector 170. In some embodiments, malicious file detector 170 comprises one or more of script extractor module 172, prediction engine 174, machine learning (ML) model 176, and/or cache 178.

Script extractor module 172 is used in connection with determining whether to use a predictive engine in connection with a domain. In some embodiments, script extractor module 172 determines a file type of a file and determines whether to extract a script (e.g., an installer script) corresponding to the file based at least in part on the file type. As an example, in response to determining that the file corresponds to (or comprises) a Microsoft Windows PE, script extractor module 172 determines to use malicious file detector 170 in connection with determining whether the file is malicious (or benign). As another example, in response to determining that the file corresponds to a file type for which a file structure (e.g., header information) is not sufficient to determine whether a file is malicious (e.g., the file type has a similar file structure/information regardless of whether the file is malicious or benign), malicious file detector 170 (e.g., script extractor module 172) determines to use malicious file detector 170 in connection with determining whether the file is malicious (or benign). In some embodiments, malicious file detector 170 (e.g., script extractor module 172) determines whether information pertaining to a particular file is comprised in a dataset of historical files and historical information associated with the historical dataset indicating whether a particular file is malicious (e.g., a third party service such as VirusTotal™). In response to determining that information pertaining to a particular file is not comprised in, or available in, dataset of historical files and historical information, script extractor module 172 determines to use malicious file detector 170 (e.g., predictive engine 174) to determine whether the particular file is malicious. An example of the historical information associated with the historical files indicating whether a particular files is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

In some embodiments, malicious file detector 170 (e.g., script extractor module 172) determines that a received file is newly analyzed (e.g., that the file is not within the historical information/dataset, is not on a whitelist or blacklist, etc.). Malicious file detector 170 (e.g., script extractor module 172) may detect that a file is newly analyzed in response to security platform 140 receiving the file from a security entity (e.g., a firewall) or endpoint within a network. For example, malicious file detector 170 may detect that a file is newly analyzed contemporaneous with security platform 140, or malicious file detector 170, receiving the file. As another example, malicious file detector 170 (e.g., script extractor module 172) may detect that a file is newly analyzed according to a predefined schedule (e.g., daily, weekly, monthly, etc.), such as in connection with a batch process. In response to determining that a file is received that has not yet been analyzed with respect to whether such file is malicious (e.g., the system does not comprise historical information with respect to such file), malicious file detector 170 determines whether to use a script (e.g. installer script) associated with the file in connection with determining whether the file is malicious (e.g., based at least in part on a file type of the file), and malicious file detector 170 uses script extractor module 172 to extract the script corresponding to the file. In some embodiments, script extractor module 172 extracts the script in a sandbox environment of the system.

In some embodiments, in response to determining that information indicating whether the file is malicious (e.g., deemed malicious, likely be to be malicious, a reputational score corresponding to a likelihood that the domain is malicious) is not available, the system (e.g., malicious file detector 170) determines to use predictive engine 174 to determine whether the particular file is malicious. For example, malicious file detector 170 determines whether a previous determination of whether a file is malicious is stored in cache (e.g., cache 178) or another storage system (e.g., a database storing a mapping of files or file information to an indication of whether the corresponding file is malicious, a whitelist, a blacklist, a mapping of hashes or signatures of files to indication of whether the corresponding file is malicious or benign, etc.). In response to determining that the information indicating whether the file is malicious was not previously determined and/or stored (e.g., in the cache), malicious file detector 170 determines to use predictive engine 174 in connection with determining whether the particular file is malicious. For example, malicious file detector 170 uses script extractor 172 to obtain a script corresponding to the file, and requests prediction engine 174 to determine (e.g., predict) whether a file is malicious (or to determine a likelihood that a file is malicious). Conversely, in some embodiments, in response to determining that the file was previously indicated to be malicious or previously determined by malicious file detector 170 and/or is stored in the cache (e.g., cache 178), the previously determined indication of whether the file is malicious is used such as in connection with enforcing one or more security policies for traffic to/from the domain and/or across the network.

Prediction engine 174 is used to predict whether a file is malicious. For example, prediction engine 174 is used to predict whether a script corresponding to a file is indicative of the file being malicious (e.g., to use the script corresponding to a file to determine a likelihood that the file is malicious). In some embodiments, prediction engine 174 uses the script of a file (e.g., an analysis of the script) as one factor in connection with determining whether a file is malicious/benign. For example, prediction engine 174 performs a plurality of analysis techniques (or aggregates results from the plurality of analysis techniques) and determines an aggregate result or determination of whether the file is malicious.

In some embodiments, prediction engine 174 determines (e.g., predicts) whether a file is malicious, such as for files for which historical information is not available or for files that are not on a whitelist or blacklist. Prediction engine 174 may proactively determine whether a file is malicious in response to malicious file detector 170 receiving the file and/or a hash or signature pertaining to the file. For example, in response to malicious file detector 170 determining that prediction engine 174 is to be used to determine whether a particular file is malicious (e.g., in response to receiving the file, or a hash or signature for such file), prediction engine 174 determines whether the file is malicious. According to various embodiments, prediction engine 174 determines whether a file is malicious based at least in part on the script corresponding to the file. For example, prediction engine 174 applies a machine learning model to determine whether the file is malicious (e.g., a machine learning model is applied to analyze a script corresponding to the file, etc.). Applying the machine learning model to determine whether the file is malicious may include prediction engine 174 querying machine learning model 176 (e.g., with the script, or part and/or one or more attributes of the script). In some implementations, machine learning model 176 is pre-trained and prediction engine 174 does not need to provide a set of training files to machine learning model 176 contemporaneous with a query for an indication/determination of whether a particular file is malicious. In some embodiments, prediction engine 174 receives information associated with whether the file is malicious (e.g., whether the script for the file is indicative of the file being malicious). For example, prediction engine 174 receives a result of a determination or analysis by machine learning model 176. In some embodiments, prediction engine 174 receives, from machine learning model 176, an indication of a likelihood that the file is malicious (e.g., an indication that the file is malicious, or is likely to be malicious, based on an analysis with respect to the script for the file). In response to receiving the indication of the likelihood that the file is malicious, prediction engine 174 determines (e.g., predicts) whether the file is malicious based at least in part on the likelihood that the domain is malicious. For example, prediction engine 174 compares the likelihood that the file is malicious to a likelihood threshold value. In response to a determination that the likelihood that the file is malicious is greater than a likelihood threshold value, prediction engine 174 may deem (e.g., determine that) the file to be malicious. As another example, prediction engine 174 may determine whether the file is malicious (or a likelihood that the file is malicious) based on an aggregate profile for the file. The aggregate profile for the file may be determined based at least in part on determining an aggregate score or aggregate likelihood that the file is malicious based at least in part on a likelihood that the file is malicious based on the script for the file, and one or more other likelihoods that the file is malicious based on one or more other factors or attributes associated with the file. As an example, the aggregate profile comprise a plurality of likelihoods that the file is malicious, and the various likelihoods that the file is malicious may be determined using different methods, or various information or attributes pertaining to the file. In some embodiments, the system predicts whether the file is malicious based at least in part on an aggregate likelihood that the file is malicious. The aggregate likelihood may be a weighted likelihood that is determined by associating weights to each of the plurality of likelihoods that the file is malicious which are determined using different methods, or various information or attributes pertaining to the file. The various weights for each of (or at least a subset of) the plurality of likelihoods that a file is malicious may be predefined. Prediction engine 174 may determine that a file is malicious in response to a determination that the aggregate likelihood that the file is malicious exceeds a predefined threshold value (e.g., a malicious likelihood threshold).

According to various embodiments, in response to prediction engine 174 determining that the file is malicious, the system sends to a security entity (or endpoint such as a client) an indication that the file is malicious. For example, malicious file detector 170 may send to a security entity (e.g., a firewall) or network node (e.g., a client) an indication that the file is malicious. The indication that the file is malicious may correspond to an update to a blacklist of file (e.g., corresponding to malicious file) such as in the case that the file is deemed to be malicious, or an update to a whitelist of file (e.g., corresponding to non-malicious file) such as in the case that the file is deemed to be benign. In some embodiments, malicious file detector 170 sends a hash or signature corresponding to the file in connection with the indication that the file is malicious or benign. The security entity or endpoint may compute a hash or signature for a file and perform a lookup against a mapping of hashes/signatures to indications of whether files are malicious/benign (e.g., query a whitelist and/or a blacklist). In some embodiments, the hash or signature uniquely identifies the file.

Machine learning model 176 predicts whether a file is malicious based at least in part on a model and/or a script corresponding to the file (e.g., a script extracted by script extractor 172). As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc. According to various embodiments, machine learning model 176 uses a relationship and/or pattern of information comprised in a script for a files (e.g., calls to executables, calls to bitcoin wallets, executables that are to be run, other items pointed to in the script, etc.) and/or a training set to estimate whether the file is malicious, such as to predict a likelihood that the file is malicious. For example, machine learning model 176 use a machine learning process to analyze a set of relationships between an indication whether a file is malicious (or benign) and one or more attributes pertaining to a domain script for the file, and uses the set of relationships to generate a prediction model for predicting whether a particular file is malicious. In some embodiments, in response to predicting that a particular file is malicious, an association between the file and the indication that the file is malicious is stored such at malicious file detector 170 (e.g., cache 178). In some embodiments, in response to predicting a likelihood that a particular file is malicious, an association between the file and the likelihood that the file is malicious is stored such as at malicious domain file 170 (e.g., cache 178). Machine learning model 176 may provide the indication whether a particular file is malicious, or a likelihood that the particular file is malicious, to prediction engine 174. In some implementations, machine learning model 176 provides prediction engine 174 with an indication that the analysis by machine learning model 176 is complete and that the corresponding result (e.g., the prediction result) is stored in cache 178.

According to various embodiments, machine learning model 176 uses one or more features in connection with predicting whether a file is malicious (or a likelihood that a file is malicious). For example, machine learning model 176 may be trained using one or more features. Examples of the features used in connection with training/applying the machine learning model 176 include (a) a feature pertaining to an executable being called by a script for a file, such as a reputation for the executable being called, (b) a feature pertaining to a text or alphanumeric string of an executable being called by a script for a file; (c) a feature pertaining to a bitcoin walled being called by a script for a file; (d) a feature pertaining to a text or alphanumeric string of a bitcoin wallet being called by a script for a file; (e) a feature pertaining to a text-based string comprised in a script for a file; (f) a feature pertaining to an alphanumeric string comprised a script for a file. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

Cache 178 stores information pertaining to a file and/or a script for the file. In some embodiments, cache 178 stores mappings of indications of whether a file is malicious (or likely malicious) to particular files, or mappings of indications of whether a file is malicious (or likely malicious) to hashes or signatures corresponding to files. Cache 178 may store additional information pertaining to a set of files such as script information for files in the set of files, hashes or signatures corresponding to files in the set of files, other unique identifiers corresponding to files in the set of files, executables called by the files, bitcoin wallets called by the files, pointers comprised in the files, etc.

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/ harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attach, a malicious file (e.g., malware) is sent as an attachment to a message such as an email, an instant message, etc. Upon selecting the attachment, the malware program may be installed at the client device. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32y1hkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Detecting and preventing DNS tunneling attacks is difficult for a variety of reasons. Many legitimate services (e.g., content delivery networks, web hosting companies, etc.) legitimately use the subdomain portion of a domain name to encode information to help support use of those legitimate services. The encoding patterns used by such legitimate services can vary widely among providers and benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious domains can efficiently and proactively be detected (e.g., shortly after registration of a domain), and security policies may be enforced with respect to malicious files within a network or entering a network, and to block such malicious files, or to otherwise alert a user or administrator of the malicious files (e.g., send a notification, provide a prompt to a user, etc.).

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32y1hkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to open a file that was received, such as via an attachment to an email, instant message, or otherwise exchanged via a network, or when a client device receives such a file, DNS module 134 uses the file (or a computed hash or signature, or other unique identifier, etc.) as a query to security platform 140. This query can be performed contemporaneously with receipt of the file, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using malicious file detector 170) whether the queried file is a malicious file (or likely to be a malicious file) and provide a result back to DNS module 134 (e.g., "malicious DNS tunneling" or "non-tunneling").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

In some embodiments, malicious file detector 170 provides to a security entity, such as data appliance 102, an indication whether a file is malicious. For example, in response to determining that the file is malicious, malicious file detector 170 sends an indication that the file is malicious to data appliance 102, and the data appliance may in turn enforce one or more security policies based at least in part on the indication that the file is malicious. The one or more security policies may include isolating the file, deleting the file, alerting or prompting the user of the maliciousness of the file prior to the user opening/executing the file, etc. As another example, in response to determining that the file is malicious, malicious file detector 170 provides to the security entity an update of a mapping of files (or hashes, signatures, or other unique identifiers corresponding to files) to indications of whether a corresponding file is malicious, or an update to a blacklist for malicious files (e.g., identifying files domains) or a whitelist for benign files (e.g., identifying files that are not deemed malicious).

Figure 2:
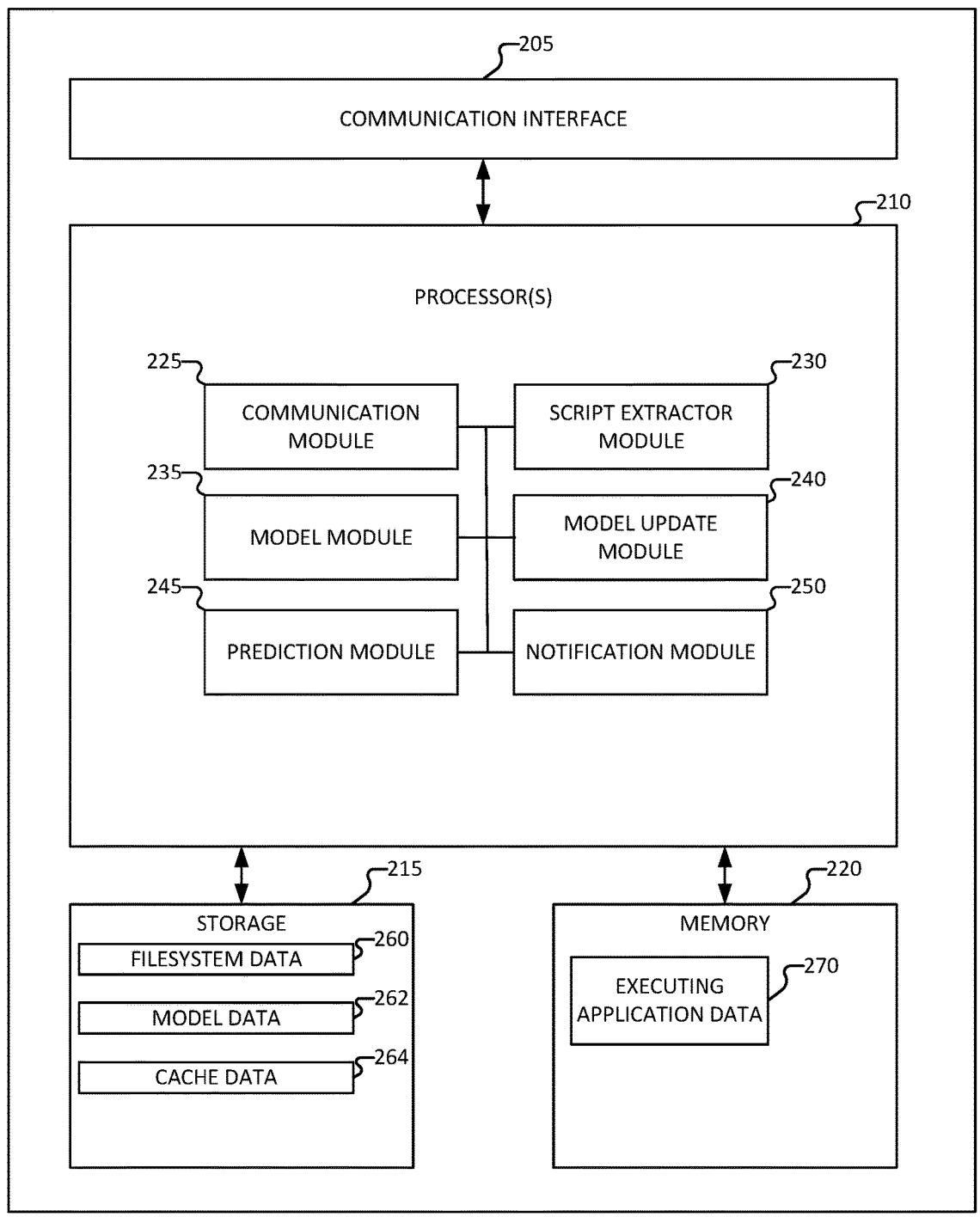
FIG. 2 is a block diagram of a system to detect a malicious file according to various embodiments.

FIG. 2 is a block diagram of a system to detect a malicious file according to various embodiments. According to various embodiments, system 200 is implemented in connection with system 100 of FIG. 1, such as for malicious file detector 170. In various embodiments, system 200 is implemented in connection with system 300 of FIG. 3, process 400 of FIG. 4, process 500 of FIG. 5, process 600 of FIG. 6, process 700 of FIG. 7, and/or process 800 of FIG. 8. System 200 may be implemented in one or more servers, a security entity such as a firewall, and/or an endpoint.

System 200 can be implemented by one or more devices such as servers. System 200 can be implemented at various locations on a network. For example, the malicious file detector is deployed as a service, such as a web service. The service may be provided by one or more servers (e.g., the malicious file detector is deployed on a remote server that monitors or receives files that are transmitted within or into/out of a network such as via attachments to emails, instant messages, etc., and determines whether a file is malicious, and sends/pushes out notifications or updates pertaining to the file such as an indication whether a file is malicious). As another example, the malicious file detector is deployed on a firewall.

In the example shown, system 200 implements one or more modules in connection with predicting whether a file (e.g., a newly received file) is malicious, determining a likelihood that the file is malicious, and/or providing a notice or indication of whether a file is malicious. System 200 comprises communication interface 205, one or more processors 210, storage 215, and/or memory 220. One or more processors 210 comprises one or more of communication module 225, script extractor module 230, model module 235, model update module 240, prediction module 245, and/or notification module 250.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated. As another example, communication interface 205 provides to communication module 225 information received by system 200. Communication module 225 is configured to receive files to be analyzed, such as from network endpoints or nodes such as security entities (e.g., firewalls), etc. Communication module 225 is configured to query third party service(s) for information pertaining to files (e.g., services that expose information for files such as an third party scores or assessments of maliciousness of files, a community-based score, assessment, or reputation pertaining to files, a blacklist for files, and/or a whitelist for files, etc.). For example, system 200 may use communication module 225 to query the third party service(s). Communication module 225 is configured to receive one or more settings or configurations from an administrator. Examples of the one or more settings or configurations include configurations of a model (e.g., the machine learning model), an indication of a training set for the model, information pertaining to a whitelist of domains (e.g., domains that are not deemed suspicious and for which traffic or attachments are permitted), information pertaining to a blacklist of domains (e.g., domains that are deemed suspicious and for which traffic or attachments are to be restricted).

In some embodiments, system 200 comprises script extractor module 230. System 200 uses script extractor module 230 in connection with determining whether to extract a script for a file, and with extracting a script for a file (e.g., for analysis of whether the file is malicious). For example, script extractor module 230 monitors for newly received files and performs a lookup against historical information to determine whether a file has been previously been indicated as malicious or benign. System 200 may determine (e.g., compute) a hash or signature corresponding to the file and perform a lookup against the historical information (e.g., a whitelist, a blacklist, etc.). In some implementations, script extractor module 230 corresponds to, or is similar to, script extractor 172. System 200 (e.g., script extractor module 230) may query, via communication interface 205, a third party (e.g., a third party service) for historical information pertaining to files (or a set of files or hashes/signatures for files previously deemed to be malicious or benign). System 200 (e.g., script extractor module 230) may query the third party at predetermined intervals (e.g., customer-specified intervals, etc.). As an example, script extractor module 230 may query the third party for registration information for newly analyzed files daily (or daily during the business week). In some embodiments, script extractor module 230 receives files to be analyzed such as files that are included as attachments to emails, instant messages, or that otherwise are communicated across or into/out of a network.

In response to receiving a file to be analyzed and determining that the file has not been previously analyzed/assessed based on the historical information (e.g., a whitelist, blacklist, etc.), script extractor module 230 obtains a script, such as an installer script, corresponding to the file. For example, system 200 determines to perform an assessment of whether the file is malicious based at least part on a script corresponding to the file. System 200 may determine that analysis of the structure of the file is not likely to provide an accurate assessment of the maliciousness of the file, such as in the case of Microsoft Windows PE installer file. In response to such a determination, system 200 may determine to use an assessment of the script of the file in connection with determining whether a file is malicious. In response to determining to use an assessment of the script of the file in connection with determining whether a file is malicious, system 200 invokes script extractor module 230 to obtain a script corresponding to the file. According to various embodiments, script extractor module 230 extracts the script of the file. For example, script extractor module 230 extracts the script (e.g. the installer script) into a sandbox environment. For example, system 200 invokes a sandbox for analysis of a particular file. As another example, system 200 uses a common sandbox for analysis of various files. In response to the script being extracted, script extractor module 230 provides at least part of the script (e.g., a text comprised within the script), or makes available the at least the part of the script, to system 200 (e.g., model module 235 and/or prediction module 245).

In some embodiments, system 200 comprises model module 235. System 200 uses model module 235 to determine (e.g., predict) whether the file is malicious. For example, system 200 model module 235 to determine (e.g., predict) whether the file is malicious based at least in part on the script corresponding to the file. Model module 235 determines whether the file is malicious (or is likely or indicative of being malicious) based at least in part on the script corresponding to the file and/or historical information pertaining to malicious and/or benign files (e.g., training sets, or other information obtained from third parties pertaining to an assessment of a maliciousness of one or more files, etc.). According to various embodiments, model module 235 uses a model (e.g., a machine learning model) to determine whether the file is malicious, or to determine a likelihood that the file is malicious. System 200 can manage the model (e.g., the machine learning model) via model module 235. Model module 235 determines a model used to generate predictions on whether (or a likelihood the) the file is malicious based at least in part on a machine learning process and one or more training sets. In some implementations, model module 235 corresponds to, or is similar to, machine learning model 176. Examples of information from the registration information that is used in connection with determining whether a file is malicious include: one or more alphanumeric strings comprised in the script, one or more text strings comprised in the script, one or more pointers comprised in the script, one or more executables called in the script, one or more cryptocurrency wallets (e.g., bitcoin wallets) called in the script, one or more attributes of the script, etc. Various other information corresponding to the script may be used in connection with predicting whether the file is malicious based at least in part on the model. Model module 235 may use one or more features pertaining to such information from the script, or one or more attributes pertaining to the script, etc. As an example, a feature pertaining to a reputation (e.g., an indication of an extent of maliciousness) of an attribute or the information obtained from scripts of files may be used to train/apply the model. As another example, a feature pertaining to a reputation (e.g., an indication of an extent of maliciousness) of executables called within a script may be used to train/apply the model. As another example, a feature pertaining to a reputation (e.g., an indication of an extent of maliciousness) of cryptocurrency wallets called within a script may be used to train/apply the model. As another example, a feature pertaining to a reputation (e.g., an indication of an extent of maliciousness) of alphanumeric within a script may be used to train/apply the model.

In some embodiments, model module 235 predicts a likelihood that a file is malicious, or whether a file is malicious, based at least in part on a similarity, or extent of a similarity, of the file (or information or attributes associated with a script of the file) to historical files (or scripts of such files) deemed to be malicious and/or historical files (or scripts of such files) deemed to be benign.

According to various embodiments, model module 235 uses one or more machine learning processes in connection with predicting a likelihood that a file is malicious, or whether a script corresponding to a file is indicative of the file being malicious. In some embodiments, model module 235 implements a gradient boosting tree (e.g., eXtreme Gradient Boosting (XGBoost)) model. The XGBoost model is trained using values for benign and malicious files (e.g., a training set including historical files, such as a set of files provided by a third party service that assesses maliciousness of files). In some embodiments, model module 235 implements a Recurrent Neural Networks (RNNs) process/model. In some embodiments, model module 235 implements a Convolutional Neural Networks (CNNs) process/model. In some embodiments, model module 235 implements a Long Short Term Memory (LSTM) process/model. Various other models may be implemented. Examples of machine learning processes that can be implemented in connection with training the model include random forest, linear regression, support vector machine, naive Bayes, adaptive boosting, logistic regression, K-nearest neighbors, decision trees, gradient boosted decision trees, K-means clustering, hierarchical clustering, density-based spatial clustering of applications with noise (DBSCAN) clustering, principal component analysis, etc.

Examples of the features used in connection with training/applying the machine learning model 176 include (a) a feature pertaining to an executable being called by a script for a file, such as a reputation for the executable being called, (b) a feature pertaining to a text or alphanumeric string of an executable being called by a script for a file; (c) a feature pertaining to a bitcoin walled being called by a script for a file; (d) a feature pertaining to a text or alphanumeric string of a bitcoin wallet being called by a script for a file; (e) a feature pertaining to a text-based string comprised in a script for a file; (f) a feature pertaining to an alphanumeric string comprised a script for a file. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

In some embodiments, analyzing and/or using the script corresponding to a file in connection with determining whether a file is malicious is one element of a set of elements used to determine whether a file is malicious. For example, system 200 may use a plurality of factors (e.g., elements) in connection with determining whether a file is malicious. In some embodiments, system 200 determines (e.g., generates) an aggregate profile corresponding to a file, and uses the aggregate profile to determine whether the file is malicious. As an example, the aggregate profile comprise a plurality of likelihoods that the file is malicious, and the various likelihoods that the file is malicious may be determined using different methods, or various information or attributes pertaining to the file. In some embodiments, system 200 predicts whether the file is malicious based at least in part on an aggregate likelihood that the file is malicious. The aggregate likelihood may be a weighted likelihood that is determined by associating weights to each of the plurality of likelihoods that the file is malicious which are determined using different methods, or various information or attributes pertaining to the file. The various weights for each of (or at least a subset of) the plurality of likelihoods that a file is malicious may be predefined. For example, the various weights may be defined by a developer or administrator, such as an administrator of a security detection service, a network administrator, an organization administrator, etc. In some embodiments, the various weights are determined based on a machine learning model and/or a predefined or selected sensitivity of the system, method, or device for detecting whether a file is malicious. According to various embodiments, system 200 determines that a file is malicious in response to a determination that the aggregate likelihood that the file is malicious exceeds a predefined threshold value (e.g., a malicious likelihood threshold). The predefined threshold value may be predefined by a user. For example, an administrator may set the predefined threshold value. As an example, the predefined threshold value may be set based at least in part on a desired sensitivity for detecting a malicious files (e.g., a predefined acceptable false positive rate and/or predefined acceptable false negative rate, etc.).

Model module 235 may include a plurality of models such as in the case that analyzing and/or using the script corresponding to a file in connection with determining whether a file is malicious is one element of a set of elements used to determine whether a file is malicious. The plurality of models may be trained/applied to determine whether a file is malicious based on different factors or attributes associated with a file.

In some embodiments, model module 235 detects malicious files (e.g., determines whether a file is malicious or a likelihood that a file is malicious) based at least in part on the script of the file. In some embodiments, model module 235 uses n-gram techniques on the text of the script itself to determine whether the script and/or corresponding file is malicious. The data in a script can be broken into a sequence of n-grams—a series of byte strings. As an example, suppose a portion of hexadecimal data in a script is: "1023ae42f6f28762aab." The 2-grams in the sequence are all the pairs of adjacent characters, such as: "1023," "23ae," "ae42," "42f6," etc. In various embodiments, the system is configured to analyze files using 1-grams or 2-grams. Other n-grams can also be used, such as 8-grams, 7-grams, or 4-grams, etc. In the example string above, "1023ae42f6f28762" is an 8-gram, "23ae42f6f28762aa" is an 8-gram, etc. The total number of different 8-grams possible in a byte sequence is $2^{64}$ (18,446,744,073,709,551,616). Searching for all possible 8-grams in a byte sequence would readily exceed the resources of the system. Instead, a significantly reduced set of 8-grams is obtained for use in connection with detecting whether a file is malicious. During feature extraction, all 8-grams (or other applicable n-grams in embodiments where 8-grams are not used) are extracted out of the script being processed. In particular, a histogram of the 8-grams in the sample being analyzed is extracted (e.g., into a hash table), which indicates the number of times a given 8-gram was observed in the sample being processed. One benefit of extracting 8-grams during feature analysis by the system is that potential privacy and contractual problems in using samples obtained from third parties (e.g., in constructing models) can be mitigated, as the original file cannot be reconstructed from the resulting histogram. The extracted histogram is stored in storage (e.g., a Hadoop cluster). In an example embodiment, the set of 8-gram histograms stored in the Hadoop cluster grows by approximately three terabytes of 8-gram histogram data per day. The histograms will correspond to both malicious and benign samples (which will be labeled as such, e.g., based on results of other static and dynamic analyses performed by the system).

According to various embodiments, in connection with training the model for determining whether a file is malicious based at least in part on the script comprises obtaining a script (e.g., an installer script), model module 235 obtains corresponding to a file, processing the script using a byte pair encoding (BPE) model, processing the output from the BPE model using a TF-IDF vectorizer to obtain a set of n-grams corresponding to the script, selecting a top x n-grams (e.g., x being a positive integer) from the set of n-grams, and use the top x n-grams as a feature for an gradient boosting tree (e.g., eXtreme Gradient Boosting (XGBoost)) model. The XGBoost model may be trained using values for benign and malicious files (e.g., a training set including historical files, such as a set of files provided by a third party service that assesses maliciousness of files);

the values obtained from processing the output from the BPE model using the TF-IDF vectorizer.

In some embodiments, model module 235 processes the script using the BPE model including by using the installer scripts from the training set (e.g., the historical files) as input, and identifying rare words in the script. Model module 235 may process the script using the BPE model including splitting the rare words into smaller subwords. The subwords may be deemed to be relatively more meaningful subwords. The use of subwords may be implemented to overcome challenges whereby scripts comprise numerous unique words which can make the vocabulary extremely large. For example, very large vocabularies can lead to lower detections because the model may not identify patterns within subwords. Further, very large vocabularies can lead to models that are large and/or difficult to train. The output of the processing using the BPE model may be a set of individual arrays of subwords (e.g., the BPE model processing converts the script to individual arrays of subwords).

In some embodiments, model module 235 may processes the output from the BPE model (e.g., the set of smaller subwords) using a TF-IDF vectorizer, including generating n-grams from the individual arrays of subwords. Model module 235 may generate n-grams when a sliding window of lengths specified (e.g., 1, 2, etc.) across the array to create combinations. From at least a subset of the n-grams generated, the Term Frequency-Inverse Document Frequency model (TF-IDF) determines (e.g., calculates) the TF-IDF value for the n-grams. In some embodiments, the TF-IDF value is a measure of identifying the n-grams corresponding to a script (e.g., the n-grams that are representative of the script). As an example, the TF-IDF vectorizer determines the TF-IDF by calculating which terms are most frequently seen in that the script. As an example, the terms should not be common across the entire dataset. For example, the word "the" is extremely common in any document—so it would have a high term frequency, but because it is also common across most documents—the corresponding inverse document frequency for the word "the" is low. Accordingly, the TF-IDF value for the word "the" would be low.

According to various embodiments, feature selection is a technique according to which features in a data that contribute most to the target variable are selected. In some embodiments, model module 235 implements the feature selection including by selecting a top x n-grams (e.g., x being a positive integer). According to various embodiments, x is 1000 (e.g., the top 1000 n-grams are selected). Various other values for x may be selected (e.g., 500, 5000, 10,000, etc.). The value for x may be set by an administrator or a developer of the model. The selecting the top x n-grams may be implemented using a SelectKBest model or other such model that scores values according to a predefined function. The SelectKBest model identifies the top x n-grams using ANOVA F-test method using the TF-IDF values calculated with respect to the output from the BPE model (e.g., the arrays of subwords). As an example, the ANOVA F-test method tries to identify which features produce the best groups/clusters where the variance between clusters is high, but the variance within a cluster is low. According to various embodiments, top X n-grams selected by the SelectKBest correspond to the features for an XGBoost model. The model is trained on the TF-IDF values for the n-gram features for the malicious and benign installer scripts.

In some embodiments, system 200 comprises model update module 240. System 200 uses model update module 240 to update the model used to predict whether a file is malicious is updated. Model update module 240 updates the model based at least in part one or more training sessions and/or feedback provided in response to system 200 providing predicted likelihoods or indications that a domain is malicious. Model update module 240 can be updated using records for one or more domains, such as domains deemed to be benign (e.g., google.com, Microsoft.com, apple.com, etc.) and/or domains deemed to be malicious. Examples of the one or more other models include machine learning models that determine whether a file is malicious based on one or more of: (i) a detection based on a byte pattern matching, (ii) a detection based on a PE file structure, (iii) a detection based on a dynamic analysis of malware inside a sandbox, (iv) a detection of child PE files embedded in or downloaded by the installer, and/or (v) a detection based on text-based learning on Powershell and Javascript. Various other techniques or classifications may be implemented in connection (e.g., conjunction) with the model to detect malicious files. Model module 235 may provide (e.g., to prediction module 245) the various assessments of whether a file is malicious (e.g., indications that the file is malicious, likelihoods that the file is malicious) that are generated based on the various models (e.g., that implement the various techniques or classifications), and an aggregate determination of whether a file is malicious may be performed based on the various assessments (e.g., an aggregate profile or score/likelihood may be generated).

According to various embodiments, model update module 240 obtains historical information pertaining to files such as historical files or historical scripts. A historical file may be deemed to be a file for which a determination of malicious has previously been generated. For example, a historical file may be deemed to be a domain for which third party scoring/assessment of maliciousness is available. An example of the historical information associated with the historical files indicating whether a particular file is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score) indicates whether other vendors or cyber security organizations deem the particular file to be malicious. The model may be updated in response to new historical information pertaining to files being received. For example, if a file is registered on day 1, system 200 predicts a likelihood that a file is malicious at day 1, and on day 30 historical information is generated or made available for such file (e.g., a VT score is available or a communicate-based reputational score or assessment is provided), then when system 200 receives the historical information (e.g., on day 30 or a day sometime thereafter), model update module 240 may update the model based at least in part on a relationship/comparison between the prediction by model module 235 of whether the file is malicious and the indication by the historical information as to whether the file is malicious.

In some embodiments, system 200 comprises prediction module 245. System 200 uses prediction module 245 to predict whether a file is malicious, or to predict a likelihood that the file is malicious. For example, prediction module 245 determines whether to use model module 235 in connection with predicting whether the file is malicious. As another example, prediction module 245 determines whether to use script for the file in connection with predicting whether the file is malicious (e.g., and whether to invoke script extractor module 230 to extract the script, etc.). Prediction module 245 may determine to use model module 235 to obtain an indication of whether the file is malicious based at least in part on a determination that system 200 has received a file. Prediction module 235 may further determine to use model module 235 in response to a determination that such received file does not correspond to a historical file (e.g., a file for which historical information such as from a third party service) is available. As an example, in response to determining to use model module 235 in connection with predicting whether a file is malicious, prediction module 245 sends a query to model module 235 for prediction of whether the file is malicious. In some implementations, prediction module 245 corresponds to, or is similar to, prediction engine 174 of system 100 of FIG. 1.

In some embodiments, system 200 comprises notification module 250. System 200 uses notification module 250 to provide an indication of whether the file is malicious. For example, notification module 250 obtains an indication of whether the file is malicious (or a likelihood that the file is malicious) from prediction module 245 and provides the indication of whether the file is malicious to one or more security entities and/or one or more endpoints. As another example, notification module 250 provides to one or more security entities (e.g., a firewall), nodes, or endpoints (e.g., a client terminal) an update to a whitelist of files and/or blacklist of files. In some embodiments, the indication of whether the file is malicious corresponds to an aggregate profile or aggregate likelihood that the file is malicious (e.g., a determination or likelihood determined based on a set of elements used to determine whether a file is malicious, such as a determination based on a script of the file, one or more attributes pertaining to the file, a byte pattern matching, a PE file structure, a detection of child files, etc. According to various embodiments, notification module 250 obtains a hash, signature, or other unique identifier associated with the file, and provides the indication of whether the file is malicious in connection with the hash, signature, or other unique identifier associated with the file.

According to various embodiments, the hash of a file corresponds to a MD5 hash. A security entity or an endpoint may compute an MD5 hash of a received file (e.g., a file attachment, etc.). The security entity or an endpoint may determine whether the computed MD5 hash corresponding to the file is comprised within a set such as a whitelist of benign files, and/or a blacklist of malicious files, etc. If a signature for malware (e.g., the MD5 hash of the received file) is included in the set of signatures for malicious files (e.g., a blacklist of malicious files), security entity or an endpoint can prevent the transmission of malware to an endpoint (e.g., a client device) and/or prevent an opening or execution of the malware accordingly.

According to various embodiments, storage 215 comprises one or more of filesystem data 260, model data 262, and/or cache data 264. Storage 215 comprises a shared storage (e.g., a network storage system) and/or database data, and/or user activity data.

In some embodiments, filesystem data 260 comprises a database such as one or more datasets (e.g., one or more datasets for files and/or file attributes, mappings of indicators of maliciousness to files or hashes, signature or other unique identifiers of files, mappings of indicators of benign files to files or hashes, signature or other unique identifiers of files, etc.). Filesystem data 260 comprises data such as a dataset for training a machine learning process, historical information pertaining files (e.g., maliciousness of files), a whitelist of files deemed to be safe (e.g., not suspicious), a blacklist of files deemed to be suspicious or malicious (e.g., files for which a deemed likelihood of maliciousness exceeds a predetermined/preset likelihood threshold), information associated with suspicious or malicious files such as trends or relationships, information associated with secure or safe files such as trends or relationships, etc.

Model data 262 comprises data pertaining to one or more models. As an example, data pertaining to one or more models comprises relationships and associations between files or information pertaining to files (e.g., scripts, attributes such as a bytes, structure, etc.) and indications or likelihoods that the files are malicious or benign. Model data 262 can store information pertaining to one or more machine learning processes and/or configurations for the implementation of one or more machine learning processes to predict whether a file is malicious.

Cache data 264 comprises information pertaining to predictions of whether a file is malicious. As an example, predictive cache data 264 stores indications of whether one or more files are malicious.

According to various embodiments, memory 220 comprises executing application data 270. Executing application data 270 comprises data obtained or used in connection with executing an application such as an application executing a machine learning process or for configuring a machine learning model. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious traffic, a document preparation application, a report preparation application, a user interface application, a data analysis application, an anomaly detection application, a user authentication application, a security policy management/update application, etc.).

Figure 3:
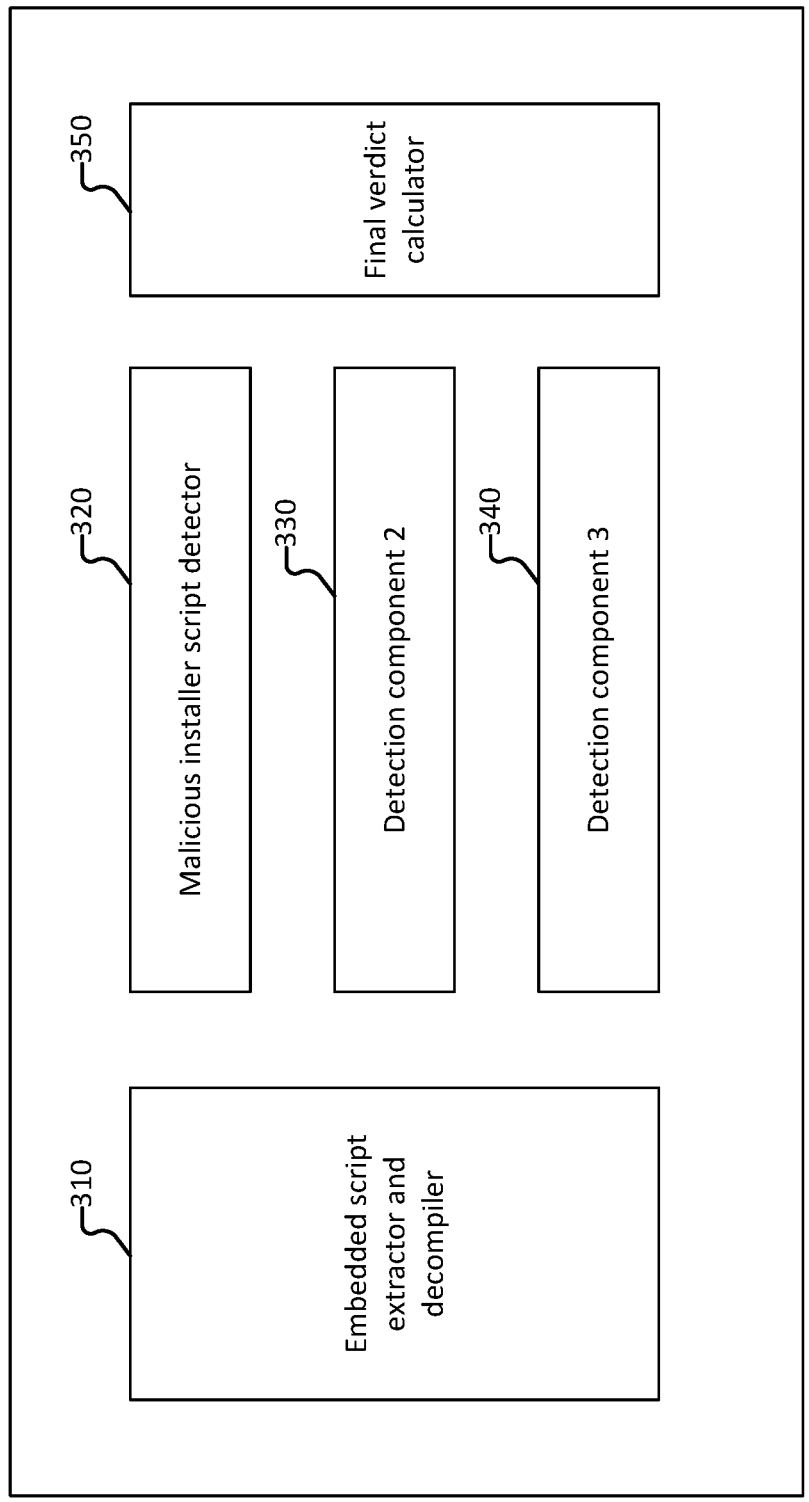
FIG. 3 is a diagram of a system for detecting a malicious file according to various embodiments.

FIG. 3 is a diagram of a system for detecting a malicious file according to various embodiments. According to various embodiments, system 300 is implemented in connection with system 100 of FIG. 1, such as for malicious file detector 170. According to various embodiments, system 300 is implemented in connection with system 200 of FIG. 2. In various embodiments, system 200 is implemented in connection with process 400 of FIG. 4, process 500 of FIG. 5, process 600 of FIG. 6, process 700 of FIG. 7, and/or process 800 of FIG. 8. System 200 may be implemented in one or more servers, a security entity such as a firewall, and/or an endpoint.

As illustrated in FIG. 3, system 300 may comprise one or more of embedded script extractor and decompiler 310, malicious installer script detector 330, detection component 2 330, detection component 3 340, and/or final verdict calculator 350. In some embodiments, system 300 comprises various detection components. For example, system 300 may comprise no detection components, a single detection components, or one or more detection components.

System 300 uses embedded script extractor and decompiler 310 in connection with extracting a script from a file and/or decompiling the file or script. In some embodiments, system 300 uses embedded script extractor and decompiler 310 to obtain (e.g., determine) one or more attributes pertaining to the file (e.g., a file being analyzed to assess whether the file is malicious, etc.). As an example, extractor and decompiler 310 obtains a structure of a file (e.g., a header of the file, etc.). As another example, extractor and decompiler 310 obtains an installer script corresponding to a file.

System 300 uses malicious installer script detector 320 in connection with determining whether a file is malicious (or a likelihood that a file is malicious) based at least in part on the script. Malicious installer script detector 320 may implement a machine learning process to determine whether a file is malicious (or a likelihood that a file is malicious) based at least in part on the script. For example, malicious installer script detector 320 may implement machine learning model 176 of system 100 of FIG. 1 and/or model module 235 of system 200 of FIG. 2. In some embodiments, malicious installer script detector 320 determines whether a file is malicious (or a likelihood that a file is malicious) based at least in part on one or more of an executable called in the extracted installer script, a cryptocurrency wallet called in the extracted installer script, an alphanumeric string comprised in the extracted installer script, etc. In some embodiments, malicious installer script detector 320 applies a machine learning process to analyze a similarity of the extracted installer script, or an attribute of the extracted installer script (an executable called in the extracted installer script, a cryptocurrency wallet called in the extracted installer script, an alphanumeric string comprised in the extracted installer script, etc.), to a training set of malicious files and/or benign files or to relationships (e.g., features) corresponding to malicious files and/or benign files.

According to various embodiments, system 300 uses detection component 2 330 and/or detection component 3 340 to determine whether a file is malicious (or a likelihood that a file is malicious) based at least in part on one or more factors associated with the file (e.g., a factor different from the use of the extracted installer script). For example, system 300 uses detection component 2 330 to determine whether a file is malicious (or a likelihood that a file is malicious) based at least in part on a byte pattern matching technique or classification. As another example, system 300 uses detection component 3 340 to determine whether a file is malicious (or a likelihood that a file is malicious) based at least in part on detection based on a PE file structure. System 300 may use detection component 2 330 and/or detection component 3 340 or one or more other detection components (not shown) to determine whether a file is malicious (or a likelihood that a file is malicious) using various other techniques or classifications. For example, system 300 may implement a technique or classification corresponding to detection of child PE files embedded in or downloaded by the installer corresponding to the file. As another example, system 300 may implement a technique or classification corresponding to detection based on text-based learning on Powershell and Javascript. As another example, system 300 may implement a technique or classification corresponding third party service or community-based scoring/assessment such as a ground truth or VirusTotal® score.

System 300 uses final verdict calculator 350 to determine whether the file is malicious based at least in part on outputs from one or more of malicious installer script detector 320, detection component 2 330, detection component 3 340, and/or one or more other detection components (not shown). For example, system 300 may use a plurality of factors (e.g., elements) in connection with determining whether a file is malicious. In some embodiments, final verdict calculator 350 determines (e.g., generates) an aggregate profile corresponding to a file, and uses the aggregate profile to determine whether the file is malicious. As an example, the aggregate profile comprise a plurality of likelihoods that the file is malicious, and the various likelihoods that the file is malicious may be determined using different methods (e.g., the outputs from malicious installer script detector 320, detection component 2 330, detection component 3 340, etc.). In some embodiments, the system predicts whether the file is malicious based at least in part on an aggregate likelihood that the file is malicious. The aggregate likelihood may be a weighted likelihood that is determined by associating weights to each of the plurality of likelihoods that the file is malicious which are determined using different methods, or various information or attributes pertaining to the file. The various weights for each of (or at least a subset of) the plurality of likelihoods that a file is malicious may be predefined. For example, the various weights may be defined by a developer or administrator, such as an administrator of a security detection service, a network administrator, an organization administrator, etc. In some embodiments, the various weights are determined based on a machine learning model and/or a predefined or selected sensitivity of the system, method, or device for detecting whether a file is malicious. For example, final verdict calculator 350 may implement a machine learning model to determine the aggregate likelihood that the file is malicious. The machine learning model may be trained using one or more datasets pertaining to detection of malicious/benign files using various techniques and/or classifications. According to various embodiments, system 300 (e.g., final verdict calculator 350) determines that a file is malicious in response to a determination that the aggregate likelihood that the file is malicious exceeds a predefined threshold value (e.g., a malicious likelihood threshold). The predefined threshold value may be predefined by a user. For example, an administrator may set the predefined threshold value. As an example, the predefined threshold value may be set based at least in part on a desired sensitivity for detecting a malicious files (e.g., a predefined acceptable false positive rate and/or predefined acceptable false negative rate, etc.).

Figure 4:
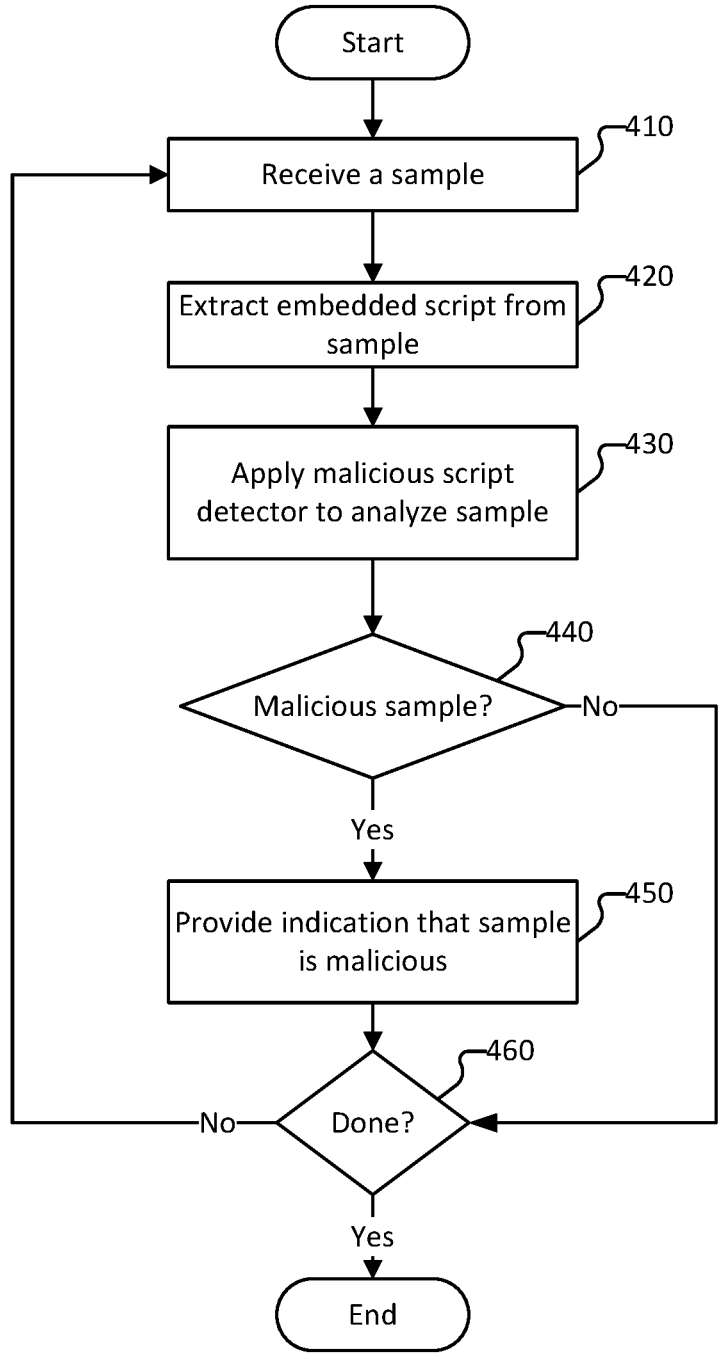
FIG. 4 is a flow diagram of a method for detecting a malicious file according to various embodiments.

FIG. 4 is a flow diagram of a method for detecting a malicious file according to various embodiments. In some embodiments, process 400 is implemented at least in part on by system 100 of FIG. 1, system 200 of FIG. 2, and/or system 300 of FIG. 3. In some implementations, process 400 may be implemented by one or more servers, such as in connection with providing a service to a network (e.g., a security entity and/or a network endpoint such as a client device). In some implementations, process 400 may be implemented by a security entity (e.g., a firewall) such as in connection with enforcing a security policy with respect to files communicated across a network or in/out of the network. In some implementations, process 400 may be implemented by a client device such as a laptop, a smartphone, a personal computer, etc., such as in connection with executing or opening a file such as an email attachment.

At 410, a sample is received. In some embodiments, the system receives a sample from a security entity (e.g., a firewall), an endpoint (e.g., a client device), etc. For example, in response to determining that a file is attached to a communication such as an email or an instant message, the security entity or endpoint provides (e.g., sends) the file to the system. The sample may be received in connection with a request to determine whether the file is malicious.

In the case that process 400 is implemented by a security entity, the sample may be received such as in connection with routing traffic to an applicable network endpoint (e.g., a firewall obtains the sample from an email attachment for an email directed to a client device). In the case that process 400 is implemented by a client device, the sample may be received by an application or layer monitoring incoming/outgoing information. For example, a process (e.g., an application, an operating system process, etc.) may run in the background to monitor and obtain email attachments, files exchanged over an instant messaging program, etc.

At 420, an embedded script is extracted from the sample. In some embodiments, the system extracts the script (e.g., an installer script) from the sample. In some embodiments, the system extract the script from the sample in response to a determination that system is to analyze the file to determine whether the sample is malicious such as in the case of Microsoft Windows PE installer file.

System 200 may extract the embedded script in response to a determination that analysis of the structure of the sample is not likely to provide an accurate assessment of the maliciousness of the sample, such as in the case of Microsoft Windows PE installer file, system 200 may determine to use an assessment of the script of the file in connection with determining whether a file is malicious. For example, detection that a Microsoft Windows PE installer file is malicious based on the PE structure of such file is difficult and/or inaccurate because the PE file structure for Microsoft Windows PE installer based files look extremely similar between malicious and benign files.

According to various embodiments, the system extracts the script from the sample within a sandbox environment. The system may use the sandbox environment to ensure secure handling of the file such as to avoid a malicious file from infecting another file or module of the system.

At 430, a malicious script detector is applied to analyze the sample. In some embodiments, the malicious script detector correspond to, or is similar to, machine learning model 176, model module 235, and/or malicious installer script detector 320. The malicious script detector may implement a machine learning process to analyze the script corresponding to the sample. The machine learning process may determine whether the sample is malicious (or a likelihood that the sample is malicious) based at least in part on the script.

Various embodiments use a machine learning model to detect malicious files based at least in part on the script corresponding to a sample such as an installer file. In some embodiments, a text classification model (e.g., a text classification model machine learning model) used in connection with determining whether the sample is malicious. The text classification machine learning model is trained/developed using content of installer scripts (e.g., text or other information comprised in the scripts) used in benign and malicious installer files. As an example, the text classification model can be a machine learning or deep learning model that learns from the characters, tokens or terms in the scripts of malicious and/or benign files.

At 440, a determination of whether the sample is malicious is performed. In some embodiments, the system determines whether the sample is malicious based at least in part on the analysis of the sample using the malicious script detector.

In some embodiments, in response to malicious script detector determining that the sample is malicious, or in response to a likelihood generated by malicious script detector that the sample is malicious exceeding a predefined likelihood threshold, the system deems sample to be malicious.

In some embodiments, the result of the analysis of the sample using the malicious script detector is a single element or factor used in connection with determining whether the sample is malicious. In some embodiments, analyzing and/or using the script corresponding to a file in connection with determining whether a file is malicious is one element of a set of elements used to determine whether a file is malicious. For example, the system may use a plurality of factors (e.g., elements) in connection with determining whether a file is malicious. In some embodiments, the system determines (e.g., generates) an aggregate profile corresponding to a file, and uses the aggregate profile to determine whether the file is malicious. As an example, the aggregate profile comprise a plurality of likelihoods that the file is malicious, and the various likelihoods that the file is malicious may be determined using different methods, or various information or attributes pertaining to the file. In some embodiments, the system predicts whether the file is malicious based at least in part on an aggregate likelihood that the file is malicious. The aggregate likelihood may be a weighted likelihood that is determined by associating weights to each of the plurality of likelihoods that the file is malicious which are determined using different methods, or various information or attributes pertaining to the file. The various weights for each of (or at least a subset of) the plurality of likelihoods that a file is malicious may be predefined. For example, the various weights may be defined by a developer or administrator, such as an administrator of a security detection service, a network administrator, an organization administrator, etc. In some embodiments, the various weights are determined based on a machine learning model and/or a predefined or selected sensitivity of the system, method, or device for detecting whether a file is malicious. According to various embodiments, the system determines that a file is malicious in response to a determination that the aggregate likelihood that the file is malicious exceeds a predefined threshold value (e.g., a malicious likelihood threshold). The predefined threshold value may be predefined by a user. For example, an administrator may set the predefined threshold value. As an example, the predefined threshold value may be set based at least in part on a desired sensitivity for detecting a malicious files (e.g., a predefined acceptable false positive rate and/or predefined acceptable false negative rate, etc.).

In response to a determination that the sample is malicious at 440, process 400 proceeds to 450 at which an indication that the sample is malicious is provided. For example, the indication that the sample is malicious may be provided to the component from which the sample is received. As an example, the system provides the indication that the sample is malicious to a security entity. As another example, the system provides the indication that the sample is malicious to a client device. As an example, the security provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

In response to a determination that the sample is not malicious at 440, process 400 proceeds to 460. In some embodiments, in response to determining that the sample is not malicious, a mapping of files (or hashes/signatures of files) to an indication that the file is not malicious is updated. For example, a whitelist of benign files is updated to include the sample, or hash, signature, or other unique identifier associated with the sample.

At 460, a determination is made as to whether process 400 is complete. In some embodiments, process 400 is determined to be complete in response to a determination that no further samples are to be analyzed (e.g., no further predictions for files are needed), an administrator indicates that process 400 is to be paused or stopped, etc. In response to a determination that process 400 is complete, process 400 ends. In response to a determination that process 400 is not complete, process 400 returns to 410.

Figure 5:
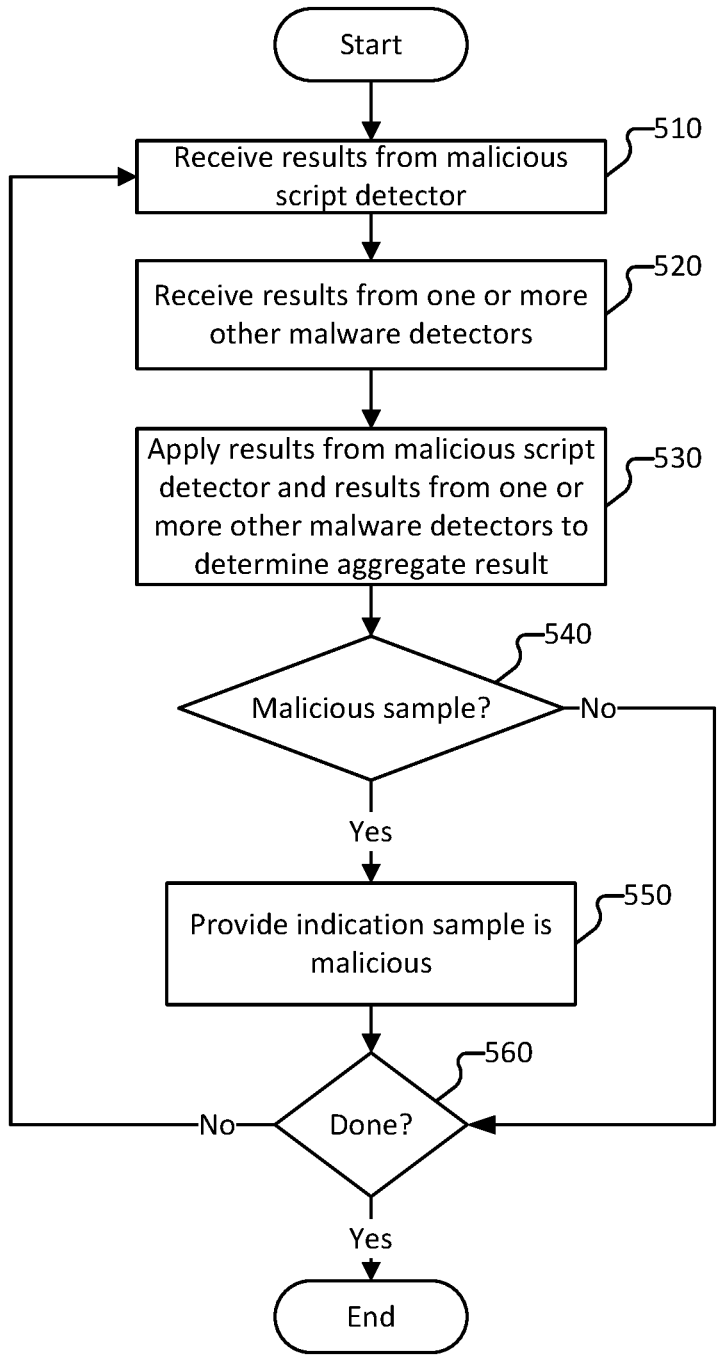
FIG. 5 is a flow diagram of a method for detecting a malicious file according to various embodiments.

FIG. 5 is a flow diagram of a method for detecting a malicious file according to various embodiments. In some embodiments, process 500 is implemented at least in part on by system 100 of FIG. 1, system 200 of FIG. 2, and/or system 300 of FIG. 3. In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network. In some implementations, process 500 may be implemented by a client device such as a laptop, a smartphone, a personal computer, etc., such as in connection with executing or opening a file such as an email attachment.

At 510, results from the malicious script detector are received. In some embodiments, the system receives an indication of whether a sample is malicious or benign. In some embodiments, the system receives a value corresponding to a likelihood that the sample is malicious. As an example, the value may be a percentage (e.g., a value between 0 and 1, inclusive). As another example, the value is a score on a preset scale (e.g., a scale that may be mapped to percentages or ranges of percentages, etc.). In some embodiments, the receiving the results from the malicious script detector comprises receiving results from malicious installer script detector 320 of system 300 of FIG. 3, etc.

At 520, results from one or more other malware detectors are received. In some embodiments, the system receives one or more values corresponding to a likelihood that the sample is malicious from one or more other malware detectors. As an example, the values may be a percentage (e.g., a value between 0 and 1, inclusive). As another example, the values may be a score on a preset scale (e.g., a scale that may be mapped to percentages or ranges of percentages, etc.). In some embodiments, the receiving the results from one or more other malware detectors comprises receiving results from detection component 2 330 and/or detection component 3 340 of system 3 of FIG. 3, etc.

According to various embodiments, the one or more malware detectors use various other techniques or classifications in connection with determining whether the sample is malicious (or a likelihood that the sample is malicious). As an example, the one or more malware detectors may implement a technique or classification corresponding to byte pattern matching technique or classification. As another example, the one or more malware detectors may implement a technique or classification corresponding to detection based on a PE file structure. As another example, the one or more malware detectors may implement a technique or classification corresponding to detection of child PE files embedded in or downloaded by the installer corresponding to the file. As another example, the one or more malware detectors may implement a technique or classification corresponding to detection based on text-based learning on Powershell and Javascript. As another example, the one or more malware detectors may implement a technique or classification corresponding third party service or community-based scoring/assessment such as a ground truth or VirusTotal® score.

At 530, results from the malicious script detector and results from one or more other malware detectors are applied to determine an aggregate result. In embodiments, the system determines an aggregate result based on a predetermined function or model. For example, the system aggregates the one or more values corresponding to a likelihood that the sample is malicious from the malicious script detector and the one or more other malware detectors. The system determining the aggregate result may correspond to, or be similar to, final verdict calculator 350 of system 300 of FIG. 3.

In some embodiments, the system determines (e.g., generates) an aggregate profile corresponding to a sample, and uses the aggregate profile to determine whether the sample is malicious. As an example, the aggregate profile comprise a plurality of likelihoods that the sample is malicious, and the various likelihoods that the sample is malicious may be determined using different methods (e.g., the outputs from malicious installer script detector 320, detection component 2 330, detection component 3 340, etc.). In some embodiments, the system predicts whether the sample is malicious based at least in part on an aggregate likelihood that the sample is malicious. The aggregate likelihood may be a weighted likelihood that is determined by associating weights to each of the plurality of likelihoods that the sample is malicious which are determined using different methods, or various information or attributes pertaining to the sample. The various weights for each of (or at least a subset of) the plurality of likelihoods that a sample is malicious may be predefined. For example, the various weights may be defined by a developer or administrator, such as an administrator of a security detection service, a network administrator, an organization administrator, etc. In some embodiments, the various weights are determined based on a machine learning model and/or a predefined or selected sensitivity of the system, method, or device for detecting whether a sample is malicious. For example, the system may implement a machine learning model to determine the aggregate likelihood that the sample is malicious. The machine learning model may be trained using one or more datasets pertaining to detection of malicious/benign files using various techniques and/or classifications.

At 540, a determination of whether the sample is malicious is performed. In some embodiments, the system determines that the sample is malicious in response to a determination that the aggregate likelihood that the file is malicious exceeds a predefined threshold value (e.g., a malicious likelihood threshold). The predefined threshold value may be predefined by a user. For example, an administrator may set the predefined threshold value. As an example, the predefined threshold value may be set based at least in part on a desired sensitivity for detecting a malicious files (e.g., a predefined acceptable false positive rate and/or predefined acceptable false negative rate, etc.).

In response to a determination that the sample is malicious at 540, process 500 proceeds to 550 at which an indication that the sample is malicious is provided. The indication that the sample is malicious may be provided to a malicious file detector. In some embodiments, the indication that the sample is malicious may be provided to the component from which the sample is received. As an example, the system provides the indication that the sample is malicious to a security entity. As another example, the system provides the indication that the sample is malicious to a client device. As an example, the security provides the indication that the sample is malicious to a client device. In some embodiments, the indication that the sample is malicious is provided to a user such as a user of a client device and/or a network administrator.

In some embodiments, the system provides the indication that the file is malicious (e.g., in connection with providing the sample or a hash/signature/other unique identifier of the sample) to a third party service such as to a service that provides a community-based reputational scoring or assessment of files.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

In response to a determination that the sample is not malicious at 540, process 500 proceeds to 560. In some embodiments, in response to determining that the sample is not malicious, a mapping of files (or hashes/signatures of files) to an indication that the file is not malicious is updated. For example, a whitelist of benign files is updated to include the sample, or hash, signature, or other unique identifier associated with the sample.

At 560, a determination is made as to whether process 500 is complete. In some embodiments, process 500 is determined to be complete in response to a determination that no further samples are to be analyzed (e.g., no further predictions for files are needed), an administrator indicates that process 500 is to be paused or stopped, etc. In response to a determination that process 500 is complete, process 500 ends. In response to a determination that process 500 is not complete, process 500 returns to 510.

Figure 6:
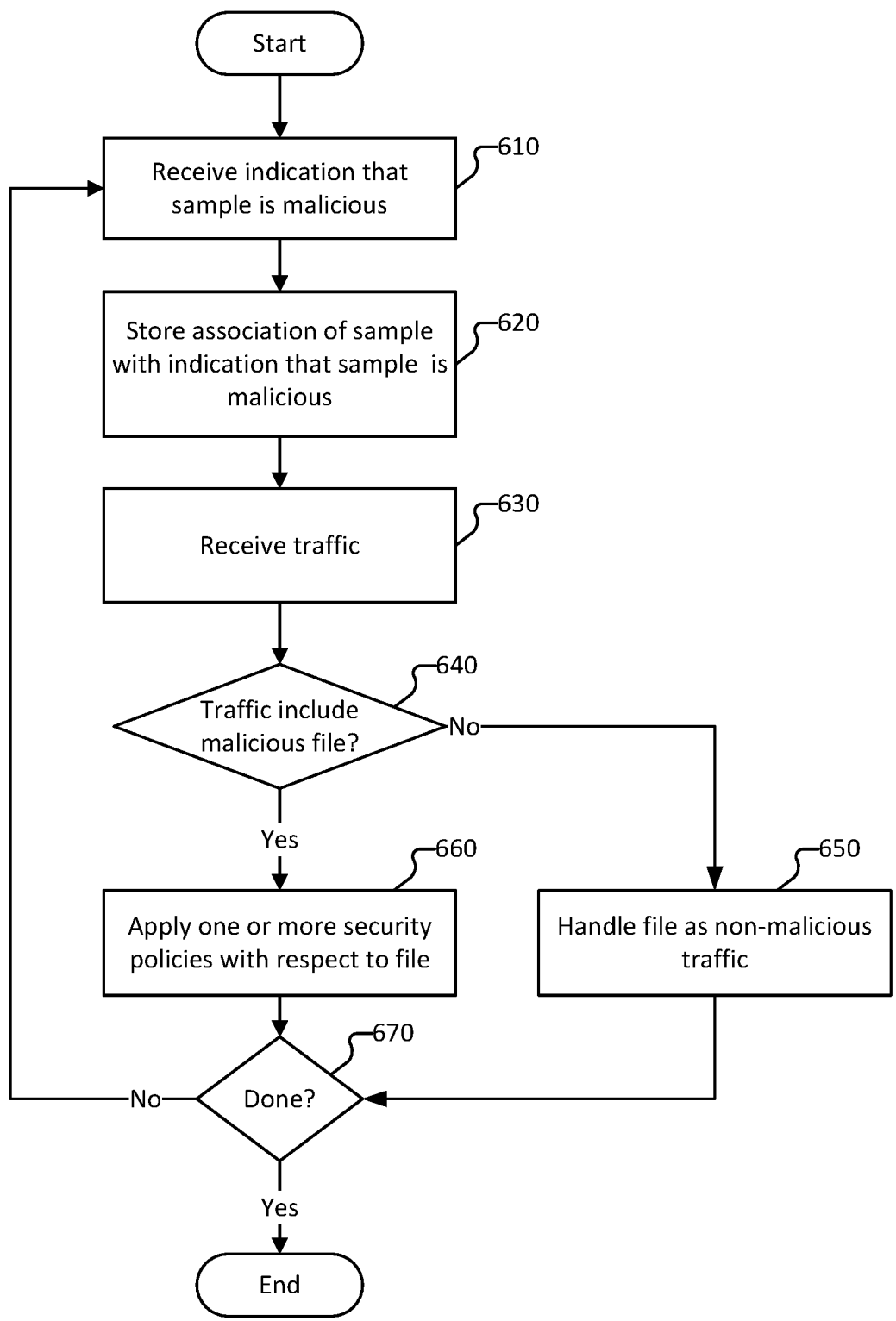
FIG. 6 is a flow diagram of a method for detecting a malicious file according to various embodiments.

FIG. 6 is a flow diagram of a method for detecting a malicious file according to various embodiments. In some embodiments, process 600 is implemented at least in part on by system 100 of FIG. 1, system 200 of FIG. 2, and/or system 300 of FIG. 3. In some implementations, process 500 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network. In some implementations, process 600 may be implemented by a client device such as a laptop, a smartphone, a personal computer, etc., such as in connection with executing or opening a file such as an email attachment.

At 610, an indication that the sample is malicious is received. In some embodiments, the system receives an indication that a sample is malicious and the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that the sample is malicious is received in connection with an update to a set of previously identified malicious files. For example, the system receives the indication that the sample is malicious as an update to a blacklist of malicious files.

At 620, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file.

At 630, traffic is received. The system may obtain traffic such as in connection with routing traffic within/across a network, or mediating traffic into/out of a network such as a firewall, or a monitoring of email traffic or instant message traffic.

At 640, a determination of whether the traffic includes a malicious file is performed. In some embodiments, the system obtains the file from the received traffic. For example, the system identifies the file as an attachment to an email, identifies the file as being exchanged between two client devices via instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector to determine whether the file is malicious. For example, the system may quarantine the file until the system receives response form the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious file detector 170 of system 100 of FIG. 1, system 200 of FIG. 2, and/or system 300 of FIG. 3. As an example, the malicious file detector may implement a malicious script detector (e.g., implement a machine learning process to analyze a script of the file to determine whether the file is malicious, or a likelihood that the file is malicious.

In some embodiments, the system determines whether the file is comprised in the set of previously identified malicious files or the set of previously identified benign files by computing a hash or determining a signature or other unique identifier associated with the file, and performing a lookup in the set of previously identified malicious files or the set of previously identified benign files for a file matching the hash, signature or other unique identifier. Various hashing techniques may be implemented.

In response to a determination that the traffic does not include a malicious files at 640, process 600 proceeds to 650 at which the file is handled as non-malicious traffic/information.

In response to a determination that the traffic does not include a malicious files at 640, process 600 proceeds to 660 at which the file is handled as malicious traffic/information. The system may handle the malicious traffic/information based at least in part on one or more policies such as one or more security policies.

According to various embodiments, the handling of the file malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 670, a determination is made as to whether process 600 is complete. In some embodiments, process 600 is determined to be complete in response to a determination that no further samples are to be analyzed (e.g., no further predictions for files are needed), an administrator indicates that process 600 is to be paused or stopped, etc. In response to a determination that process 600 is complete, process 600 ends. In response to a determination that process 600 is not complete, process 600 returns to 610.

Figure 7:
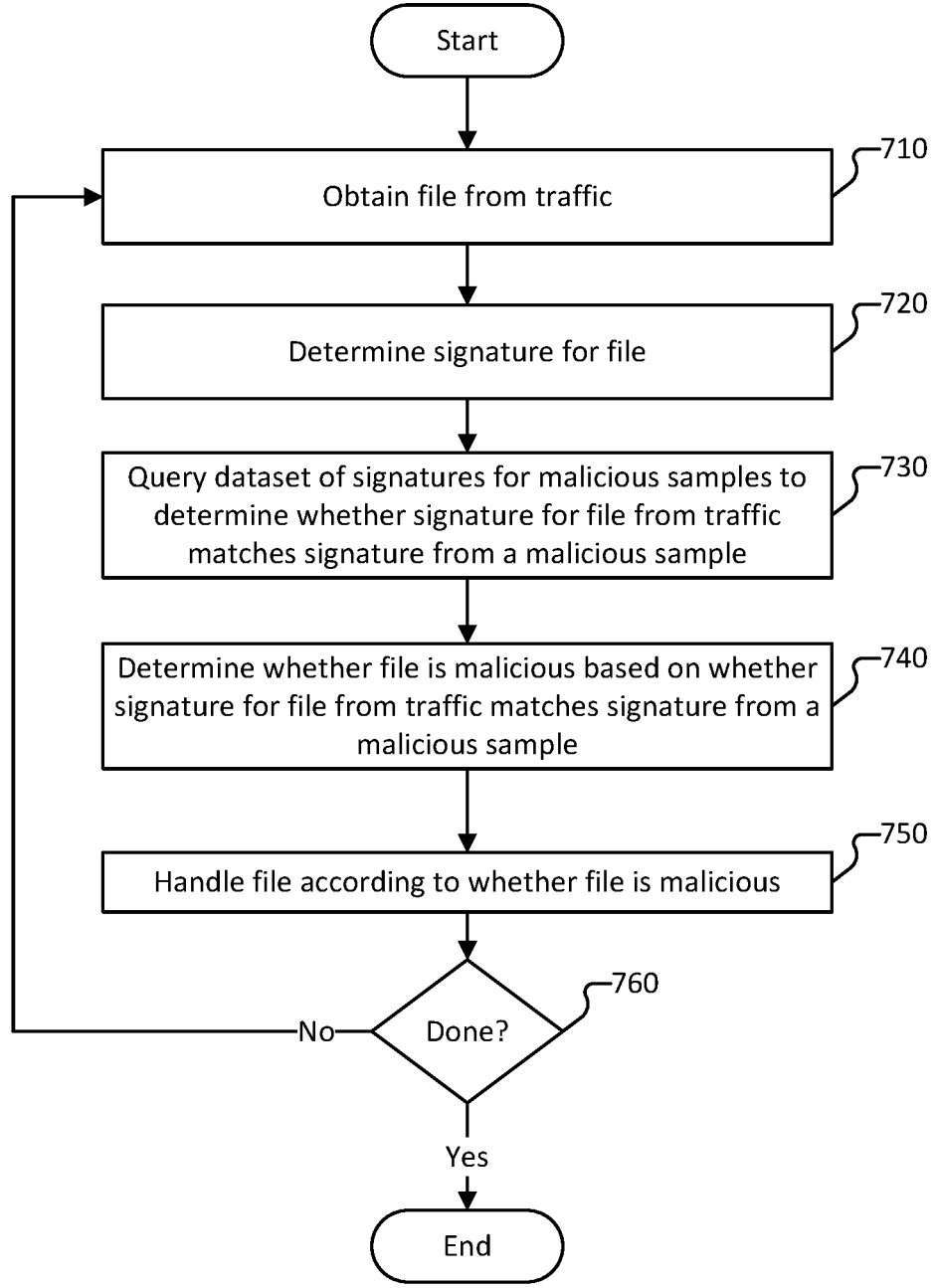
FIG. 7 is a flow diagram of a method for detecting a malicious file according to various embodiments.

FIG. 7 is a flow diagram of a method for detecting a malicious file according to various embodiments. In some embodiments, process 700 is implemented at least in part on by system 100 of FIG. 1, system 200 of FIG. 2, and/or system 300 of FIG. 3. In some implementations, process 500 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

At 710 a file is obtained from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via instant message program or other file exchange program, etc.

At 720, a signature corresponding to the file is determined. In some embodiments, the system computes a hash or determines a signature or other unique identifier associated with the file. Various hashing techniques may be implemented. For example, the hashing technique may be the determining (e.g., computing) the MD5 hash for a file.

At 730, a dataset for signatures of malicious samples is queried to determine whether the signature corresponding to the file matches a signature from a malicious sample. In some embodiments, the system performing a lookup in the dataset for signatures of malicious samples for a file matching the hash, signature or other unique identifier. The dataset for signatures of malicious samples may be stored locally at the system or remotely on a storage system that is accessible to the system.

At 740, a determination of whether the file is malicious is made based at least in part on whether a signature for the file matches a signature for a malicious sample. In some embodiments, the system determines whether the dataset of malicious signature comprises a record matching the signature for the file obtained from traffic.

At 750, the file is handled according to whether the file is malicious. In some embodiments, in response to determining that the file is malicious, the system applies one or more security policies with respect to the file. In some embodiments, in response to determining that the file is not malicious, the system handles the file as being benign (e.g., the file is handled as normal traffic).

At 760, a determination is made as to whether process 700 is complete. In some embodiments, process 700 is determined to be complete in response to a determination that no further samples are to be analyzed (e.g., no further predictions for files are needed), an administrator indicates that process 700 is to be paused or stopped, etc. In response to a determination that process 700 is complete, process 700 ends. In response to a determination that process 700 is not complete, process 700 returns to 710.

Figure 8:
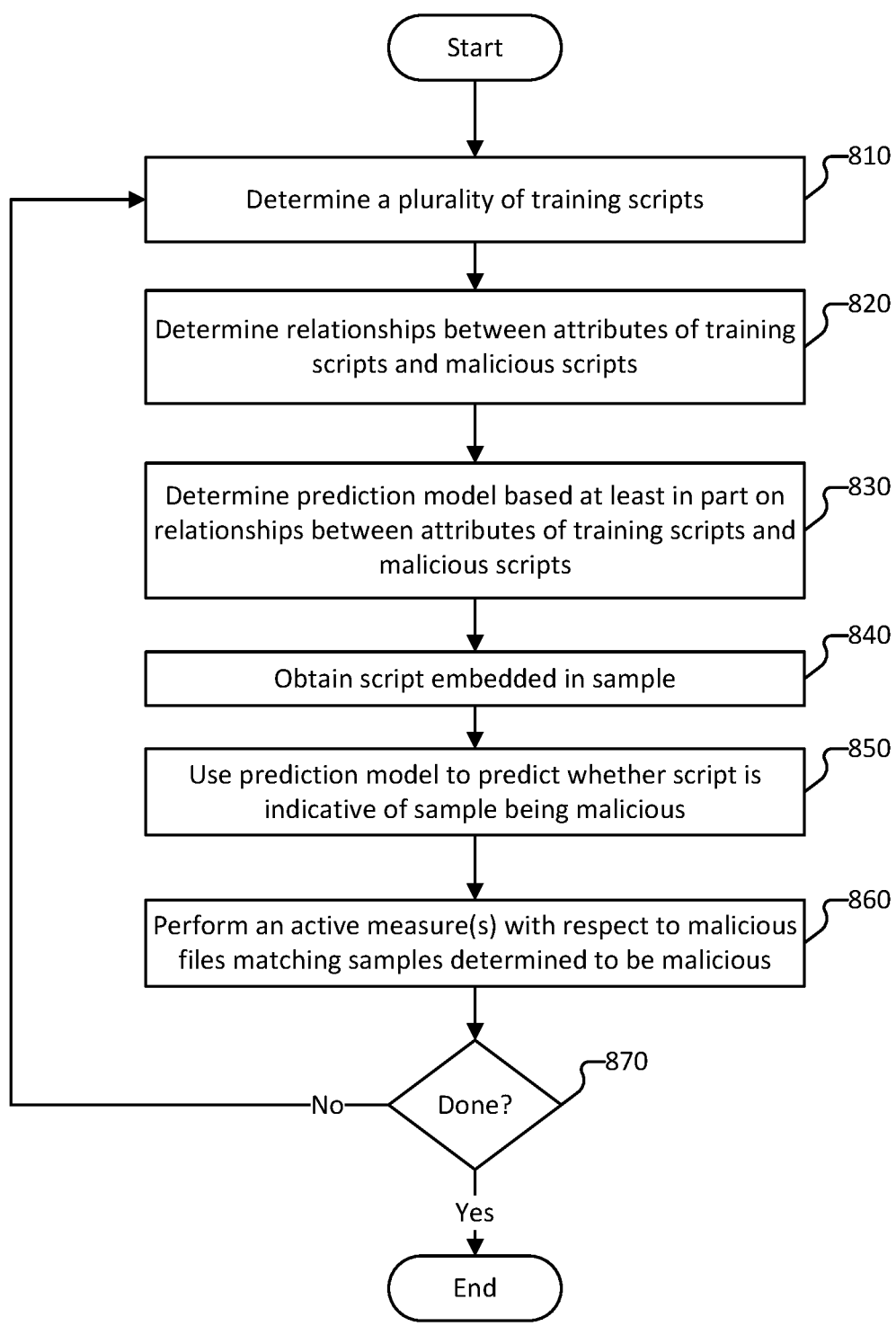
FIG. 8 is a flow diagram of a method for detecting a malicious file according to various embodiments.

FIG. 8 is a flow diagram of a method for detecting a malicious file according to various embodiments. In some embodiments, process 800 is implemented at least in part on by system 100 of FIG. 1, system 200 of FIG. 2, and/or system 300 of FIG. 3. In some implementations, process 500 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network. In some implementations, process 800 may be implemented in part by a client device such as a laptop, a smartphone, a personal computer, etc., such as in connection with executing or opening a file such as an email attachment.

At 810, a plurality of training scripts is determined. In some embodiments, the plurality of training scripts are determined (e.g., selected) from among a set of scripts corresponding to malicious files and a set of scripts corresponding to benign files. The set of scripts corresponding to malicious files may be obtained from historical files (e.g., historical information such as for files for which a third party service has provided an assessment on the maliciousness of a file, and such assessment is commonly accepted among malware security service providers, etc.).

At 820, one or more relationships between the attributes of the training scripts to malicious scripts are determined. According to various embodiments, the system determines (or obtains) features for training the prediction model based at least in part on the plurality of training scripts.

At 830, a prediction model is determined based at least in part on the one or more relationships between the attributes of the training scripts to malicious scripts.

In some embodiments, the model to detect malicious files based at least in part on the script uses n-gram techniques on the text of the script itself to determine whether the script and/or corresponding file is malicious. The data in a script can be broken into a sequence of n-grams—a series of byte strings. As an example, suppose a portion of hexadecimal data in a script is: "1023ae42f6f28762aab." The 2-grams in the sequence are all the pairs of adjacent characters, such as: "1023," "23ae," "ae42," "42f6," etc. In various embodiments, the system is configured to analyze files using 1-grams or 2-grams. Other n-grams can also be used, such as 8-grams, 7-grams, or 4-grams, etc. In the example string above, "1023ae42f6f28762" is an 8-gram, "23ae42f6f28762aa" is an 8-gram, etc. The total number of different 8-grams possible in a byte sequence is $2^{64}$ (18,446,744,073,709,551,616). Searching for all possible 8-grams in a byte sequence would readily exceed the resources of the system. Instead, a significantly reduced set of 8-grams is obtained for use in connection with detecting whether a file is malicious. During feature extraction, all 8-grams (or other applicable n-grams in embodiments where 8-grams are not used) are extracted out of the script being processed. In particular, a histogram of the 8-grams in the sample being analyzed is extracted (e.g., into a hash table), which indicates the number of times a given 8-gram was observed in the sample being processed. One benefit of extracting 8-grams during feature analysis by the system is that potential privacy and contractual problems in using samples obtained from third parties (e.g., in constructing models) can be mitigated, as the original file cannot be reconstructed from the resulting histogram. The extracted histogram is stored in storage (e.g., a Hadoop cluster). In an example embodiments, the set of 8-gram histograms stored in the Hadoop cluster grows by approximately three terabytes of 8-gram histogram data per day. The histograms will correspond to both malicious and benign samples (which will be labeled as such, e.g., based on results of other static and dynamic analyses performed by the system).

According to various embodiments, the training the model for determining whether a file is malicious based at least in part on the script comprises obtaining a script (e.g., an installer script) corresponding to a file, processing the script using a byte pair encoding (BPE) model, processing the output from the BPE model using a TF-IDF vectorizer to obtain a set of n-grams corresponding to the script, selecting a top x n-grams (e.g., x being a positive integer) from the set of n-grams, and use the top x n-grams as a feature for an gradient boosting tree (e.g., eXtreme Gradient Boosting (XGBoost)) model. The XGBoost model is trained using values for benign and malicious files (e.g., a training set including historical files, such as a set of files provided by a third party service that assesses maliciousness of files); the values obtained from processing the output from the BPE model using the TF-IDF vectorizer.

In some embodiments, the processing the script using the BPE model includes using the installer scripts from the training set (e.g., the historical files) as input, and identifying rare words in the script. The processing using the BPE model splits the rare words into smaller subwords. The subwords may be deemed to be relatively more meaningful subwords. The use of subwords is implemented to overcome challenges whereby scripts comprise numerous unique words which can make the vocabulary extremely large. For example, very large vocabularies can lead to lower detections because the model may not identify patterns within subwords. Further, very large vocabularies can lead to models that are large and/or difficult to train. The output of the processing using the BPE model is a set of individual arrays of subwords (e.g., the BPE model processing converts the script to individual arrays of subwords).

In some embodiments, the processing the output from the BPE model (e.g., the set of smaller subwords) using a TF-IDF vectorizer includes generating n-grams from the individual arrays of subwords. N-grams can be generated when a sliding window of lengths specified (e.g., 1, 2, etc.) across the array to create combinations. From at least a subset the n-grams generated (e.g., part of the n-grams, all the n-grams, etc.), the Term Frequency-Inverse Document Frequency model (TF-IDF) determines (e.g., calculates) the TF-IDF value for the n-grams. In some embodiments, the TF-IDF value is a measure of identifying the n-grams corresponding to a script (e.g., the n-grams that are representative of the script). As an example, the TF-IDF vectorizer determines the TF-IDF by calculating which terms are most frequently seen in that the script. As an example, the terms should not be common across the entire dataset. For example, the word "the" is extremely common in any document—so it would have a high term frequency, but because it is also common across most documents—the corresponding inverse document frequency for the word "the" is low. Accordingly, the TF-IDF value for the word "the" would be low.

According to various embodiments, feature selection is a technique according to which features in a data that contribute most to the target variable are selected. In some embodiments, the feature selection includes the selecting a top x n-grams (e.g., x being a positive integer). According to various embodiments, x is 1000 (e.g., the top 1000 n-grams are selected). Various other values for x may be selected (e.g., 500, 5000, 10,000, etc.). The selecting the top x n-grams may be implemented using a SelectKBest model or other such model that scores values according to a predefined function. The SelectKBest model identifies the top x n-grams using ANOVA F-test method using the TF-IDF values calculated with respect to the output from the BPE model (e.g., the arrays of subwords). As an example, the ANOVA F-test method tries to identify which features produce the best groups/clusters where the variance between clusters is high, but the variance within a cluster is low. According to various embodiments, top X n-grams selected by the SelectKBest correspond to the features for an XGBoost model. The model is trained on the TF-IDF values for the n-gram features for the malicious and benign installer scripts.

Various other machine learning processes may be implemented in connection with determining whether a file is malicious. For example, text classification models such as Recurrent Neural Networks (RNNs), Convolutional Neural Networks (CNNs), Long Short Term Memory (LSTM) models may be implemented.

At 840, a script embedded in a file is obtained. In some embodiments, the system receives the file from traffic. The file may be an attachment to an email, information exchanged in an instant message program or another file exchange program. In response to receiving the file, the system obtains the script embedded in the file. For example, the system may extract the script (e.g., an installer script) from the file in a sandbox environment.

At 850, the prediction model is used to predict whether the script is indicative of the sample being malicious. According to various embodiments, in response to obtaining the script, the system implements a machine learning model process to determine whether the sample is malicious based at least in part on the script of the file (e.g., based on executables called in the script, cryptocurrency wallets called in the script, various alphanumeric strings in the script, etc.). In some embodiments, the prediction model is used in connection with one or more other prediction models, such as models implemented by detection component 2 330, and/or detection component 340, etc.

In some embodiments, the prediction model uses n-gram techniques on the text of the script itself to determine whether the script and/or corresponding file is malicious.

At 860, an active measure(s) with respect to malicious files matching samples determined to be malicious.

According to various embodiments, in response to receiving the indication that the file is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 870, a determination is made as to whether process 800 is complete. In some embodiments, process 800 is determined to be complete in response to a determination that no further samples are to be analyzed (e.g., no further predictions for files are needed), an administrator indicates that process 800 is to be paused or stopped, etc. In response to a determination that process 800 is complete, process 800 ends. In response to a determination that process 800 is not complete, process 800 returns to 810.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a sample, wherein the sample is a Microsoft Windows Portable Executable (PE) file;
extract an embedded script from the sample, wherein the embedded script is an installer script, wherein the installer script is extracted in a sandboxed environment;
determine one or more features based at least in part on the installer script;
apply a malicious script detector in connection with determining whether the sample is malicious, wherein the malicious script detector determines a sample classification based at least in part on querying a machine learning model based at least in part on the one or more features; and
in response to determining that the sample is malicious, send, to a security entity, an indication that the sample is malicious; and
a memory coupled to the one or more processors and configured to provide the one or more processors with instructions.

2. The system of claim 1, wherein extracting the embedded script comprises:
extracting the installer script from the sample; and
decompiling the installer script to obtain code corresponding to the installer script.

3. The system of claim 1, wherein applying malicious script detector in connection with determining whether the embedded script is malicious comprises:
applying the machine learning model to determine whether the embedded script is malicious.

4. The system of claim 3, wherein the machine learning model is trained based at least in part on one or more code samples that have been deemed to be malicious.

5. The system of claim 2, wherein the applying the machine learning model to determine whether the embedded script is malicious comprises:
analyzing code corresponding to the embedded script to determine whether the code comprises one or more elements that are indicative of malicious code.

6. The system of claim 5, wherein the machine learning model is trained to learn the one or more elements that are indicative of malicious code.

7. The system of claim 5, wherein analyzing code corresponding to the embedded script to determine whether the code comprises one or more elements that are indicative of malicious code comprises:
applying a text classification machine learning model prediction in connection with detecting, in the code, the one or more elements that are indicative of malicious code.

8. The system of claim 1, wherein the machine learning model is trained based at least in part on one or more attributes associated with code samples previously deemed to be malicious.

9. The system of claim 1, wherein:
applying the malicious script detector in connection with determining whether the sample is malicious comprises:
determining a likelihood that code corresponding to the embedded script is malicious; and
the sample is deemed to be malicious in response to a determination that the likelihood that the code corresponding to the embedded script is malicious is greater than a likelihood threshold value.

10. The system of claim 9, wherein the likelihood that the code corresponding to the embedded script is malicious is determined based at least in part on a degree of similarity between the code and one or more other malicious code samples.

11. The system of claim 1, wherein the security entity enforces one or more security policies with respect to the sample based at least in part on the indication that the sample is malicious.

12. The system of claim 11, wherein the one or more security policies are configured based at least in part on a customer setting.

13. The system of claim 11, wherein the security entity blocks traffic comprising the sample in response to receiving the indication that the sample is malicious.

14. The system of claim 1, wherein the security entity is a firewall.

15. The system of claim 1, wherein a signature or file hash corresponding to the sample is sent to the security entity in connection with sending the indication that the sample is malicious.

16. The system of claim 1, wherein a result of the malicious script detector is used as a factor with one or more other factors to determine whether the sample is malicious.

17. The system of claim 1, wherein one or more factors used in connection with malicious script detector determining that the code corresponding to the embedded script is malicious comprises: a call to an executable file or to a cryptocurrency wallet.

18. A method, comprising:
receiving, by one or more processors, a sample, wherein the sample is a Microsoft Windows Portable Executable (PE) file;
extracting an embedded script from the sample, wherein the embedded script is an installer script, wherein the installer script is extracted in a sandboxed environment;
determining one or more features based at least in part on the installer script;
applying a malicious script detector in connection with determining whether the sample is malicious, wherein the malicious script detector determines a sample classification based at least in part on querying a machine learning model based at least in part on the one or more features; and
in response to determining that the sample is malicious, sending, to a security entity, an indication that the sample is malicious.

19. A computer program product embodied in a non-transitory computer readable medium and comprising computer instructions for:
receiving, by one or more processors, a sample, wherein the sample is a Microsoft Windows Portable Executable (PE) file;
extracting an embedded script from the sample, wherein the embedded script is an installer script, wherein the installer script is extracted in a sandboxed environment;
determining one or more features based at least in part on the installer script;
applying a malicious script detector in connection with determining whether the sample is malicious, wherein the malicious script detector determines a sample classification based at least in part on querying a machine learning model based at least in part on the one or more features; and
in response to determining that the sample is malicious, sending, to a security entity, an indication that the sample is malicious.

20. The system of claim 1, wherein applying malicious script detector in connection with determining whether the embedded script is malicious comprises:
using the machine learning model to perform text classification on the installer script; and
determining whether the sample is malicious based at least in part on the text classification.

21. The system of claim 1, wherein the one or more processors are further configured to determine that the sample is malicious based at least in part on one or more of (i) an executable called in the extracted installer script, (ii) a cryptocurrency wallet called in the extracted installer script, and (iii) an alphanumeric string comprised in the extracted installer script.

22. The system of claim 1, wherein the one or more processors are further configured to determine that the sample is malicious based at least in part on the installer script and a PE file structure for the sample.

* * * * *